(12) United States Patent
Higbie

(10) Patent No.: US 10,997,618 B2
(45) Date of Patent: *May 4, 2021

(54) COMPUTER-BASED DIGITAL MEDIA CONTENT CLASSIFICATION, DISCOVERY, AND MANAGEMENT SYSTEM AND RELATED METHODS

(71) Applicant: Colin Higbie, Orange, NH (US)

(72) Inventor: Colin Higbie, Orange, NH (US)

(*) Notice: Subject to any disclaimer, the term of this patent is extended or adjusted under 35 U.S.C. 154(b) by 165 days.

This patent is subject to a terminal disclaimer.

(21) Appl. No.: 16/372,265

(22) Filed: Apr. 1, 2019

(65) Prior Publication Data

US 2019/0236629 A1 Aug. 1, 2019

Related U.S. Application Data

(60) Continuation-in-part of application No. 15/638,138, filed on Jun. 29, 2017, and a continuation-in-part of application No. 14/616,124, filed on Feb. 6, 2015, now Pat. No. 10,248,717, and a division of application No. 13/893,151, filed on May 13, 2013, now abandoned, which is a continuation of application No. 12/886,502, filed on Sep. 20, 2010, now abandoned.

(Continued)

(51) Int. Cl.
*G06Q 30/02* (2012.01)
(52) U.S. Cl.
CPC ......... *G06Q 30/0206* (2013.01); *G06Q 30/02* (2013.01)
(58) Field of Classification Search
CPC ..................... G06Q 30/0206; G06Q 30/02

USPC ......................................................... 707/754
See application file for complete search history.

(56) References Cited

U.S. PATENT DOCUMENTS

| | | | |
|---|---|---|---|
| 5,794,220 A | 8/1998 | Hunt | G06Q 30/06 |
| 6,519,571 B1 | 2/2003 | Guheen | G06Q 30/02 |

(Continued)

OTHER PUBLICATIONS

Great Britain Examination Report issued in application No. GB1613580.8, dated Nov. 17, 2020 (5 pgs).

(Continued)

*Primary Examiner* — Hicham Skhoun
(74) *Attorney, Agent, or Firm* — Hayes Soloway P.C.

(57) ABSTRACT

A digital media content classification, discovery, and management system includes a computerized database storing content representative identifiers corresponding to content items. Each of the content representative identifiers is keyed to a plurality of author-based, content-centered criteria elements, wherein an input selection field of a user GUI has a plurality of selectable fields which matches at least one of the plurality of author-based, content-centered criteria elements. management of the digital media content may include valuation management where the digital content items are ranked into valuation tiers. The ranking is analyzed to designate the digital content items to have a valuation value within at least one of the plurality of valuation tiers. The digital content items axe graphically displayed on a GUI of a remotely-located user computing device and download requests are received from the user computing device. Valuation of the digital content items may be adjusted based on the download requests.

16 Claims, 18 Drawing Sheets

Related U.S. Application Data

(60) Provisional application No. 61/937,487, filed on Feb. 8, 2014, provisional application No. 61/296,049, filed on Jan. 19, 2010, provisional application No. 61/244,025, filed on Sep. 19, 2009.

(56) References Cited

U.S. PATENT DOCUMENTS

| | | | |
|---|---|---|---|
| 7,124,099 B2 | 10/2006 | Mesaros | |
| 7,447,646 B1 | 11/2008 | Agarwal | G06Q 20/201 |
| 7,584,118 B1 | 9/2009 | Bellare et al. | 705/14 |
| 7,739,153 B1 | 6/2010 | Anderson et al. | 705/26 |
| 8,341,195 B1 | 12/2012 | Cole | 705/51 |
| 9,609,374 B2 | 3/2017 | Peterson | H04N 21/2543 |
| 9,799,059 B1 | 10/2017 | Curtis | G06Q 30/0283 |
| 2001/0047413 A1 | 11/2001 | Landau et al. | 709/225 |
| 2002/0053078 A1 | 5/2002 | Holtz et al. | 725/14 |
| 2003/0172135 A1 | 9/2003 | Bobick | H04L 63/0428 |
| 2005/0119936 A1 | 6/2005 | Buchanan et al. | |
| 2005/0256778 A1 | 11/2005 | Boyd | G06Q 30/0244 |
| 2006/0190290 A1 | 8/2006 | Gomez | G06Q 50/188 |
| 2006/0206385 A1 | 9/2006 | Walker | 705/21 |
| 2007/0100777 A1 | 5/2007 | Floyd | 705/400 |
| 2008/0027827 A1 | 1/2008 | Eglen et al. | 705/26 |
| 2008/0120287 A1 | 5/2008 | Guan | |
| 2008/0140433 A1 | 6/2008 | Levy et al. | |
| 2008/0154798 A1 | 6/2008 | Valz | 705/400 |
| 2008/0167940 A1 | 7/2008 | Dube | G06Q 30/0283 |
| 2009/0019375 A1 | 1/2009 | Garofalo | |
| 2009/0048860 A1 | 2/2009 | Brotman | 700/26 |
| 2009/0055242 A1 | 2/2009 | Rewari et al. | |
| 2009/0164383 A1 | 6/2009 | Rothman | G06Q 30/0206 |
| 2009/0328093 A1 | 12/2009 | Cansler | H04N 21/2668 |
| 2010/0063877 A1 | 3/2010 | Soroca et al. | 705/14.45 |
| 2010/0318542 A1 | 12/2010 | Davis | G06F 17/30038 |
| 2010/0332296 A1 | 12/2010 | Gharabally | 705/14.2 |
| 2011/0082703 A1 | 4/2011 | Higbie | 705/1.1 |
| 2011/0082761 A1 | 4/2011 | Eglen | 705/26.1 |
| 2011/0295722 A1 | 12/2011 | Reisman | 750/27.1 |
| 2012/0221396 A1 | 8/2012 | Eglen | 705/14.24 |
| 2012/0239663 A1 | 9/2012 | Tzruya | G06F 17/30867 |
| 2013/0060621 A1 | 3/2013 | Walker | 705/14.23 |
| 2013/0103592 A1 | 4/2013 | Shenk et al. | |
| 2013/0212039 A1 | 8/2013 | Burckart | 705/347 |
| 2013/0246307 A1 | 9/2013 | Sundaram | 705/36 R |
| 2013/0297581 A1* | 11/2013 | Ghosh | G06F 16/337 707/706 |
| 2014/0089053 A1 | 3/2014 | Iorga | 705/7.35 |
| 2016/0078509 A1 | 3/2016 | Yamano | G06Q 30/0609 |
| 2016/0275118 A1 | 9/2016 | Ge et al. | G06F 17/30321 |
| 2016/0275192 A1 | 9/2016 | Miao et al. | G06F 17/30867 |

OTHER PUBLICATIONS

Notice of Allowance issued in U.S. Appl. No. 15/638,138, dated Dec. 8, 2020 (9 pgs).
U.S. Appl. No. 14/616,124, filed Feb. 6, 2015.
U.S. Appl. No. 15/638,138, filed Jun. 29, 2017, Higbie.
Canada Office Action issued in application No. 2,913,460, dated Jun. 2, 2020 (6 pgs).
Great Britain Examination Report issued in application No. GB1613580.8, dated Jul. 7, 2020 (2 pgs).
Office Action issued in U.S. Appl. No. 15/638,138, dated Aug. 5, 2020 (17 pgs).
European Office Action issued in application No. 10 817 994.6, dated Dec. 22, 2017 (5 pg).
Great Britain Examination Report issued in application No. GB1520636.0, dated Aug. 15, 2017 (7 pgs).
Notice of Allowance issued in U.S. Appl. No. 14/616,124, dated Aug. 15, 2018 (16 pgs).
Office Action issued in U.S. Appl. No. 12/886,502, dated Jun. 12, 2012 (9 pgs).
Office Action issued in U.S. Appl. No. 12/886,502, dated Oct. 2, 2013 (7 pgs).
Office Action issued in U.S. Appl. No. 13/893,151, dated Dec. 29, 2016 (15 pgs).
Office Action issued in U.S. Appl. No. 13/893,151, dated Jun. 6, 2016 (12 pgs).
Office Action issued in U.S. Appl. No. 13/893,151, dated Nov. 20, 2015 (7 pgs).
Office Action issued in U.S. Appl. No. 14/286,528, dated Aug. 11, 2017 (5 pgs).
Office Action issued in U.S. Appl. No. 14/286,528, dated Mar. 30, 2017 (41 pgs).
Office Action issued in U.S. Appl. No. 14/286,528, dated Nov. 17, 2016 (30 pgs).
Office Action issued in U.S. Appl. No. 14/616,124, dated May 4, 2017 (28 pgs).
Office Action issued in U.S. Appl. No. 14/616,124, dated Nov. 2, 2017 (26 pgs).
Office Action issued in U.S. Appl. No. 15/664,201, dated Mar. 7, 2019 (47 pgs).
Yalin Wang et al., "Document Zone Content Classification and its Performance Evaluation", Pattern Recognition, Jan. 31, 2006, vol. 39, Issue 1, pp. 57-73.

* cited by examiner

80

82 — A plurality of content representative identifiers may be stored on a computerized database, wherein each of the plurality of content representative identifiers corresponds of plurality of content items, respectively, and wherein each of the plurality of content representative identifiers is keyed to a plurality of author-based, content-centered criteria elements, wherein the plurality of author-based, content-centered criteria elements are identified by an author of the each of the plurality of content items 84 — The computerized database is accessed by a user through at least one electronic communication channel 86 — The plurality of content representative identifiers are filtered, using a processor in communication with the computerized database, using at least one input selection field displayed on a graphical user interface (GUI) of a computerized device of the user, wherein the at least one input selection field has a plurality of selectable fields, wherein each of the plurality of selectable fields matches at least one of the plurality of author-based, content-centered criteria elements 88 — A result of the filtered plurality of selectable fields is displayed on the GUI of the computer device of the user

FIG. 3

```
┌─────────────────────┐   ┌─────────────────────┐   ┌─────────────────────┐
│ 92                  │   │ 94                  │   │ 96                  │
│ A plurality of      │   │ A plurality of      │   │ The plurality of    │
│ author-based,       │   │ content             │   │ content             │
│ content-centered    │   │ representative      │   │ representative      │
│ criteria elements   │   │ identifiers are     │   │ identifiers are     │
│ for the content     │   │ keyed, using a      │   │ stored within a     │
│ item are identified │   │ processor of a      │   │ computerized        │
│ by an author of a   │   │ computerized        │   │ database            │
│ content item        │   │ device, to each of  │   │ accessible through  │
│                     │   │ the plurality of    │   │ at least one        │
│                     │   │ author-based,       │   │ electronic          │
│                     │   │ content-centered    │   │ communication       │
│                     │   │ criteria elements,  │   │ channel, wherein    │
│                     │   │ whereby the         │   │ the plurality of    │
│                     │   │ content item is     │   │ content             │
│                     │   │ represented by at   │   │ representative      │
│                     │   │ least one of the    │   │ identifiers are     │
│                     │   │ plurality of        │   │ retrievable based   │
│                     │   │ content             │   │ on a search of at   │
│                     │   │ representative      │   │ least one of the    │
│                     │   │ identifiers based   │   │ plurality of        │
│                     │   │ on the plurality    │   │ author-based,       │
│                     │   │ of author-based,    │   │ content-centered    │
│                     │   │ content-centered    │   │ criteria elements   │
│                     │   │ criteria elements   │   │                     │
│                     │   │ for the content     │   │                     │
│                     │   │ item                │   │                     │
└─────────────────────┘   └─────────────────────┘   └─────────────────────┘
```

FIG. 4

COMPUTER-BASED DIGITAL MEDIA CONTENT CLASSIFICATION, DISCOVERY, AND MANAGEMENT SYSTEM AND RELATED METHODS

CROSS REFERENCE TO RELATED APPLICATIONS

This application is a continuation-in-part of U.S. application Ser. No. 14/616,124, filed Feb. 6, 2015, which claimed priority from U.S. Provisional Application Ser. No. 61/937,487, filed Feb. 8, 2014; this application is also a continuation-in-part of U.S. application Ser. No. 15/638,138, filed Jun. 29, 2017, which is a divisional of U.S. application Ser. No. 13/893,151 filed May 13, 2013 (now abandoned), which application was a continuation of U.S. application Ser. No. 12/886,502 filed Sep. 20, 2010 (now abandoned), which claimed priority from U.S. Provisional Applications 61/296,049 filed Jan. 19, 2010 and 61/244,025 filed Sep. 19, 2009, the contents of which are incorporated herein by reference.

FIELD OF THE DISCLOSURE

The present disclosure is generally related to digital media discovery and management, and more particularly is related to methods and systems for digital media content classification, discover, and management.

BACKGROUND OF THE DISCLOSURE

There exist business practices for sale of downloadable audio files, games, and other software. The Apple® App Store as a part of iTunes® is the best example of such a system. However, as these systems grow in number of applications, both customers and authors share in frustration of identifying the "good" apps. Prices are driven toward $0, as low pricing is necessary to achieve volume, and the market has become a loss leader for larger game studios to promote their titles on other platforms where they can control pricing or for independent developers who accept recognition in place of revenue.

These systems often cater to developed and well-known content providers. However, largely unknown or small content providers, such as unbranded content providers, as new entrants, face a nearly insurmountable problem having their submissions discovered by prospective customers. This shortcoming of conventional systems is largely due to the fact that a substantial portion of content is provided or marketed to prospective users is based on brand, history, or fame of the content provider. Digital content management can help alleviate these problems by using algorithms to better control which digital content users are presented with. However, most conventional management systems are simplistic and don't account for relatively unknown brands or artists who have yet to reach mainstream attention.

While the prior art includes systems for management of digital content (audio, video, e-books, and other) online, and while the free market is a means of supply and demand price setting, there are no systems that combine these in an automated fashion. Furthermore, one of the largest complaints among developers and other digital content authors on popular downloading websites is that it is difficult to generate sufficient revenue, because prices are driven toward $0 in order to attract customers. Rating systems exist, but are too subjective and sales volumes remain largely a function of price.

One solution to help prospective customers review a large number of options is to group by genre. However, this solution is also insufficient when there are thousands-to-millions of titles. While users may retrieve content that is slightly more related to his or her desires, sorting by genres provides only vague sorting. These conventional systems do not allow prospective customers to search for the particular content that would be of most interest.

Thus, a heretofore unaddressed need exists in the industry to address the aforementioned deficiencies and inadequacies.

SUMMARY OF THE DISCLOSURE

Embodiments of the present disclosure provide a digital media content classification, discovery, and management method. Briefly described, in architecture, one embodiment of the method, among others, can be summarized by the following steps: providing a plurality of digital files; associating a plurality of content representative identifiers with each of the digital files, wherein each of the plurality of content representative identifiers corresponds to at least one of a plurality of author-based, content-centered literary criteria elements assigned within literary criteria categories, wherein the plurality of author-based, content-centered literary criteria elements are identified by an author of the each of the plurality of digital files, respectively, wherein the literary criteria categories comprise: a rating factor of the digital file; a setting of the digital file; a style of the digital file; a theme of the digital file; and a main character characteristic of the digital file; determining a user selection of at least one of a plurality of selectable fields based on a selection of the literary criteria categories and the author-based, content-centered literary criteria elements thereof, using at least one input selection field displayed on a graphical user interface (GUI) of a computerized device of the user, wherein the at least one input selection field has the plurality of selectable fields, wherein each of the plurality of selectable fields matches at least one of the plurality of author-based, content-centered criteria elements; filtering the author-based, content-centered literary criteria elements based on the determined user selection, whereby author-based, content-centered literary criteria elements matching the determined user selection are populated in a results list and author-based, content-centered literary criteria elements not matching the determined user selection are omitted from the populated results list; filtering the digital files based on the filtered author-based, content-centered literary criteria elements; assigning a point value to each of the filtered author-based, content-centered literary criteria elements; ranking, based on the point value, the plurality of digital files having the filtered author-based, content-centered literary criteria elements within one of the assigned literary criteria categories against all other digital files within that assigned literary criteria category, wherein digital files in different assigned literary criteria categories are not ranked against each other; displaying a result of the filtered plurality of selectable fields on the GUI of the computer device of the user, wherein the result has at least a portion of the plurality of digital files keyed to the plurality of author-based, content-centered literary criteria elements; and saving the result of the filtered plurality of selectable fields and associating a name with the saved result, enabling the user to retrieve the same result at a later point of time.

Embodiments of the present disclosure provide a digital media management system.

Briefly described, in architecture, one embodiment of the system, among others, can comprise the following. A digital media management system has a processor and a memory. The memory stores instructions thereon for digital media content management in a distributed, network-enabled system for user purchase and download from a server to a network connected computing device. When the instruction are executed, it causes the processor to perform the steps of:

(a) providing a quantity of digital content items on a database of the server;
(b) ranking each of the digital content items;
(c) creating a plurality of valuation tiers for the digital content items;
(d) analyzing a ranking of each of the digital content items with the computer processor to thereby designate each of the digital content items to have a valuation value within at least one of the plurality of valuation tiers based on the rank of the digital content items;
(e) electronically making at least a portion of the digital content items available for purchase to at least one remotely-located user computing device through a network by transmitting computer executable code over the network that causes the valuation value for the content to be graphically displayed on a graphical user interface of the at least one remotely-located user computing device;
(f) receiving at least one download request from the at least one remotely-located user computing device through the network to download at least one digital content item from the server to the at least one remotely-located user computing device, whereby the at least one of the digital content items is downloaded from the server to the at least one remotely-located user computing device through the network; and
(g) adjusting the valuation value of at least a portion of the quantity of the digital content items according to the pricing tiers wherein the step of adjusting comprises:
(h) re-ranking at least a portion of the digital content items; and
(i) repeating the steps of (e) through (h).

Embodiments of the present disclosure provide a system for managing the accessibility of digital content to users through a network-enabled connection. Briefly described, in architecture, one embodiment of the system, among others, can comprise the following. The system for managing the accessibility of digital content to users through a network-enabled connection comprises computer executable code stored in a non-transitory memory of a computerized server wherein the code is executed by a computerized processor of the computerized server which is in communication with the physical, non-transitory memory. A database within the computerized server receives and stores digital content items, wherein the digital content items are ranked and placed in at least one of a plurality of pricing tiers, and wherein the computerized processor of the computerized server designates a valuation value for each of the digital content items based on the ranking of the digital content items, and wherein the ranked digital content item is designated into one of the plurality of pricing tiers based on the designated valuation value. A remotely-located user computing device is in communication with the computerized server through the Internet, wherein the digital content items and the valuation value corresponding to each of the digital content items are displayed on a graphical user interface of the remotely-located user computing device and made available for purchase through the Internet. A download request is received by the computerized server from the at least one remotely-located user computing device to download at least one digital content item, whereby the at least one digital content item is downloaded from the computerized server to the at least one remotely-located user computing device through the Internet. At least one modified pricing tier is created by the computerized processor of the computerized server by at least one of: creating, adding, deleting, and splitting the pricing tiers based on: at least one adjusted valuation value for the digital content item according to the pricing tiers, re-ranking the digital content items.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 is a flowchart illustrating a computer-implemented method of media discovery, in accordance with a third exemplary embodiment of the disclosure.

FIG. 4 is a flowchart illustrating a computer-implemented method of media classification, in accordance with the third exemplary embodiment of the disclosure.

DETAILED DESCRIPTION

In the following description, numerous specific details are set forth in order to provide a thorough understanding of the disclosure. However, it will be apparent to one skilled in the art that the disclosure can be practiced without these specific details. In other instances, well known circuits, components, algorithms, and processes have not been shown in detail or have been illustrated in schematic or block diagram form in order not to obscure the disclosure in unnecessary detail. Additionally, for the most part, details concerning materials, tooling, process timing, circuit layout, and die design have been omitted inasmuch as such details are not considered necessary to obtain a complete understanding of the disclosure and are considered to be within the understanding of persons of ordinary skill in the relevant art. Certain terms are used throughout the following description and claims to refer to particular system components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to . . . ."

Embodiments of the disclosure are described herein. Those of ordinary skill in the art will realize that the following detailed description of the disclosure is illustrative only and is not intended to be in any way limiting. Other embodiments of the disclosure will readily suggest themselves to such skilled persons having the benefit of this disclosure. Reference will be made in detail to implementations of the disclosure as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals. Moreover, it will be appreciated that such a development effort might be complex and time-consuming, but would nevertheless be a routine undertaking of engineering for those of ordinary skill in the art having the benefit of this disclosure.

Figure 1:
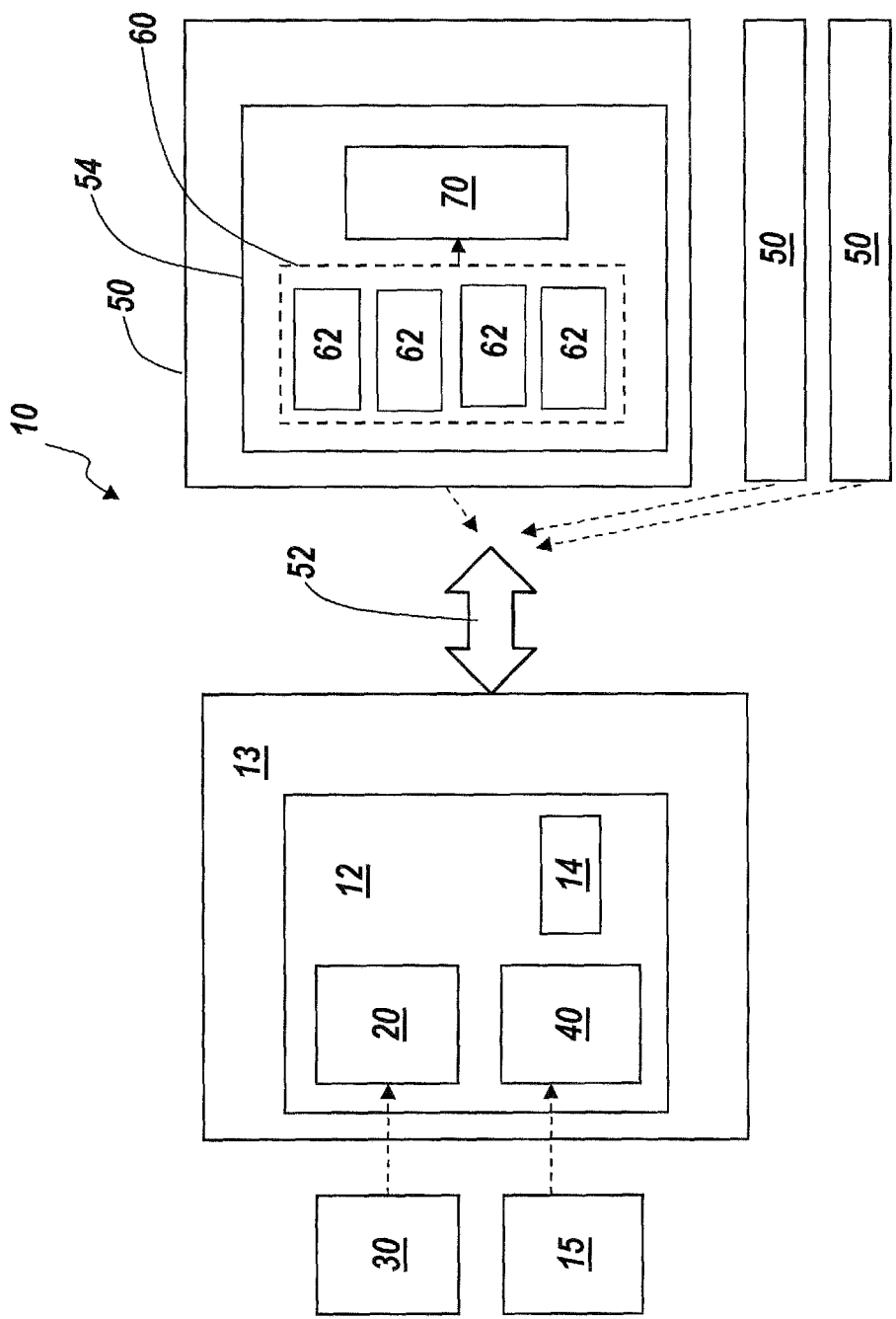
FIG. 1 is a schematic illustration of a computer-based media content classification and discovery system, in accordance with a second exemplary embodiment of the present disclosure.

FIG. 1 is a schematic illustration of a computer-based media content classification and discovery system 10, in accordance with a second exemplary embodiment of the present disclosure. The computer-based media content classification and discovery system 10 having, which may be referred to herein simply as 'system 10' includes a non-transitory computerized database 12 having a plurality of instructions executable by a processor 14. The computerized database 12 stores a plurality of content representative identifiers 20, wherein each of the plurality of content representative identifiers 20 corresponds of plurality of content items 30, which may be stored within the computerized database 12 or external thereof, as depicted in FIG. 1. Each of the plurality of content representative identifiers 20 is keyed to a plurality of author-based, content-centered criteria elements 40, wherein the plurality of author-based, content-centered criteria elements 40 are identified by an author 15 of the each of the plurality of content items 30. A plurality of user computer devices 50 are in communication with the computerized database 12 through at least one electronic communication channel 52. At least one input selection field 60 displayed on a graphical user interface (GUI) 54 of at least a portion of the plurality of user computer devices 50. The at least one input selection field 60 has a plurality of selectable fields 62, wherein each of the plurality of selectable fields 62 matches at least one of the plurality of author-based, content-centered criteria elements 40. A result 70 of the filtered plurality of selectable fields 60 are displayed on the GUI 54 of the computer device 50 of the user. The result 70 has a portion of the plurality of content items 30 keyed to the plurality of author-based, content-centered criteria elements 40.

The non-transitory memory 12 having the instructions executable by the processor 14 may be enabled as a computerized device as is known within the art. Components of the system 10 may be housed, enabled, or operated from the non-transitory memory 12 or other memory devices or databases in other computerized devices, including remote servers and user computers 16. The system 10 may be constructed as a computerized system having a plurality of modules stored within the non-transitory memory 12. Each module may be correlated with instructions within the non-transitory memory 12, each of which may relate to a specific aspect or function of the system 10.

The system 10 may facilitate a plurality of content items 30 to be filtered and searched by users of the system 10, who may be prospective purchasers of the content items 30. The content items 30 may be housed within a database that is in communication with the system 10, such as when the content items 30 are digital, downloadable content items 30 which can be downloaded or retrieved by the user after a purchase. In this situation, the downloadable content items 30 may include any type of media, including textual media such as e-books, written articles, etc., auditory and/or visual media, such as music, videos, graphics, etc., or other types of media items. In one of many alternatives, the content items 30 may have physical items, such as books, disks, paper goods, or other items which are stored remote from the system 10 and transmitted to a user after a purchase of the content item 30. In this example, the user may identify and purchase the content item 30 on the system 10 but gain possession of the content item 30 via other means.

The plurality of content representative identifiers 20 may be any type of identifier of the content item 30 it represents. For example, the content representative identifiers 20 may include the name of the content item 30, the author, a description of the content item 30, a passage of the content item 30, or other information that helps identify the content item 30. It is noted that the content representative identifiers 20 can also be the content item 30 itself when the content item 30 is hosted or stored directly on the system 10. Each content item 30 may have a corresponding content representative identifier 20, such that each content item 30 is properly identified on the system 10.

Each of the plurality of content representative identifiers 20 is keyed to a plurality of author-based, content-centered criteria elements 40 which are identified by an author 15 of the each of the plurality of content items 30. The author-based, content-centered criteria elements 40 may include elements of the content item 30 that are determined by the author of the content item 30 itself. The author-based, content-centered criteria elements 40 may include objective aspects, characteristics, or traits of the content item 30 that describe the content item 30 or assist with understanding the actual content of the content item 30. It is preferable for the author-based, content-centered criteria elements 40 to be reportable by the author reliably and accurately without subjective information.

The number and scope of the author-based, content-centered criteria elements 140 may vary largely, and may include, for example, a target audience age, sexual content, a romance content, a humor content, a mood content, a realism content, a setting type, a time period, a mystery content, political/social commentary content, a sexual content, a language content, and a pacing of the content item. Each of the author-based, content-centered criteria elements 40 may have a finite set of possible values, such that they can be objectively derived. In some situations, the author-based, content-centered criteria elements 40 can be classified as a Top Level Genre (TLG) and a non-Top Level Genre (Non-TLG). In this situation, the TLG may include author-based, content-centered criteria elements 40 that clearly and definitely can be identified within a high-level genre. For example, classifying a romance novel with a love story as the first and foremost aspect of the content as a TLG, whereas novels with no romantic elements, minor romance that is not significant to the story, or significant romantic themes are classified as Non-TLG.

Other author-based, content-centered criteria elements 40 may include any of the following items:

| Audience & Ratings |
|---|
| Violence |
| None |
| Minor |
| Death, but minimal violence |
| Major violence, death |
| Extreme violence, torture, maiming |
| Language |
| No profanity or censor words |
| Minor profanity used occasionally |
| Major use of profanity |
| Sexual Content |
| No sexual acts implied or described |
| Sexual acts implied but not described |
| Occasional detailed sex scene |
| Erotica - frequent detailed sex |
| Pornography - frequent detailed sex with detailed descriptions of acts and body parts |
| Target Audience Age |
| Everyone (no target age) |
| 0-2 |
| 3-5 |
| 6-8 |

| Audience & Ratings -continued |
|---|
| 9-12 Tween |
| 13-17 Young adult |
| 18-34 New adult/twentysomethings |
| 35-64 Working age adults |
| 65+ Senior |
| 18+ Adult only, inappropriate for children |

| Setting |
|---|
| Time Period |
| Prehistoric |
| Pre-Classical (10,000BC-1,000BC) |
| Classical (1,000BC-400CE) |
| Dark Ages (400CE-1000CE) |
| Pre-Renaissance (1000CE-1300CE) |
| 1300-1500 |
| 1500-1600 |
| 1600-1700 |
| 1700-1800 |
| 1800-1900 |
| 1900-1950 |
| 1950-1960 |
| 1960-1970 |
| 1970-1980 |
| 1980-1990 |
| 1990-2000 |
| 2000-2010 |
| 2010-2020 (Present day) |
| 2020-2030 |
| 2030-2050 |
| 2050-2100 |
| 2100-2200 |
| 2200-3000 |
| Far Future (3000+) |
| N/A |
| Geography |
| Setting Type |
| Fantasy |
| On or underwater/Nautical |
| Pastoral (rural & small towns) |
| Dystopic/Post-Apocalyptic |
| Wilderness/Desert/Other outdoors |
| Space |
| Underground |
| Urban (city) |
| Realism |
| A true story to the best of the author's knowledge |
| Consistent with real world, no magic, no unachieved science |
| World is similar to ours, but plot elements exceed our current tech level |
| World is similar to ours, but plot elements involve fantasy or magic |
| Science stretched but possible (possible science of the near future) |
| Science of far future, attempts for rigorous accuracy |
| Science well beyond modern definitions, bordering on fantasy |
| Fantasy world with low or no magic |
| Fantasy world where magic is prevalent |

| Styles & Themes |
| --- |
| Physical Action |
| Negligible physical action |
| Minor and occasional action |
| Sports-based action |
| Nature-based survival action |
| Frequent action, driven by threat to safety or life by antagonist(s) |
| Pacing |
| Time to savor, deliberate |
| Moves quickly |
| Breakneck |
| Romance |
| No romantic elements |
| Minor romance, not a significant story driver |
| Significant romantic themes |
| Major romance, essential to story |
| A Love story first and foremost |
| Mysteries & Puzzles |
| None or only very minor mysteries |
| Modest mystery element(s) to story |
| Significant mystery(ies) are core to driving the story |
| Thought-provoking puzzles tangentially related to story |
| Puzzles or clues that reader could use to solve mystery(ies) of story |
| Humor |
| Serious |
| Moments of levity |
| Dark humor |
| Humor throughout |
| Laughs take priority over all else |
| Political/Social Commentary |
| Politics irrelevant to story |
| Politics play a minor role |
| Heavy use of social and political themes on a personal level |
| Geopolitical factors major theme at an international level |
| Story includes metaphors for social or political theme(s) |
| Story is intended as metaphor for social or political theme(s) |
| Inspires Reader to Feel . . . |
| Uneasy/Tense |
| Fear/Horror |
| Sad |
| Confused/Questioning |
| Spiritual |
| Confident/Self-Motivated |
| Politically or Socially Motivated |
| Romantic |
| Nostalgic/Happy |
| N/A or None of the above |

| Main Character |
| --- |
| Gender |
| Female |
| Male |
| Transgender |
| Other or N/A |
| Age |
| Baby |
| Toddler |
| Young Child |
| Child |
| Tween |
| Teen |
| Young Adult |
| Adult |
| Middle-aged |
| Senior |

| Main Character |
| --- |
| Other or N/A |
| Race |
| Irrelevant |
| Aboriginal Australian |
| Arab, Semitic, Middle Eastern |
| Asian |
| Bengali, Indian, Dravidian, Indo-Aryan |
| Caucasian European |
| Latin American |
| Native American |
| North African |
| Pashtun, Iranian, Afghani, Pakistani |
| Sub-Saharan African |
| Alien |
| Animal |
| Deity |
| Machine/Cyborg |
| Mutant |
| Supernatural |
| Undead (Vampire, Zombie, Ghost, etc.) |
| Sexual Preference |
| Irrelevant or N/A |
| Heterosexual |
| Homosexual |
| Bisexual |
| Other |
| Religion |
| Irrelevant |
| Agnostic/Atheist |
| Amish & Mennonite |
| Bahá'í |
| Buddhist |
| Christian |
| Druid |
| Hindi |
| Jewish |
| Muslim |
| Other |
| Rastafarian |
| Satanist |
| Scientologist |
| Shinto |
| Sikh |
| Unitarian |
| Wiccan |
| Fictional Monotheistic Religion |
| Fictional Polytheistic Religion |
| Alien Religion |

The above-provided author-based, content-centered criteria elements 40 may be, for example, use to describe books. In this example, it can be seen that the author-based, content-centered criteria elements 40 may be far more descriptive than mere genres or top-level classifications of books. Accordingly, the author-based, content-centered criteria elements 140 may be characterized as content-based elements or aspects of the content items 30 that provided descriptive indicators of the content of the content item 30 beyond a general classification or genre of the content item 30. It is further noted that the author-based, content-centered criteria elements 40 may include, in some circumstances, author-based, subjective, content-centered criteria elements. For example, these author-based, subjective, content-centered criteria elements may include items that are subjectively provided, such as a user inspiration feeling, e.g., makes the user feel good, character development, e.g., character experiences social growth and awareness, rememberability of the content items, e.g., the "tune stays in your head" (for musical content items), among other, subjective criteria. Normally, the values can of these subjective, content-centered criteria elements are only set by other content consumers, not by the content creator, due to the fact that content creators (authors) are likely to perceive their own content items 30 as better than it may be. These subjective, content-centered criteria elements are subjective and can't generally set reliably by the content creator, but in some cases may find uses in the system 10.

The plurality of user computer devices 50 may include any type of computerized device, such as a personal computer, a smart phone, a tablet computer, or any others. The electronic communication channel 52 may include any type of electronic communication, such as a network connection, WiFi, etc. Once the user connects to the system 10, he or she may access the system 10 via a computer program of website hosting an application. Once the user is ready to use the system 10, at least one input selection field 60 is displayed on a GUI of the user computer device 50.

The at least one input selection field 60 may be a type of computerized menu which allows the user to appropriate use the system 10. For example, the menu may include a nester tree menu which displays options to the user based on a hierarchy of the menu item, e.g., the selectable fields 62. The plurality of selectable fields 62 match at least one of the plurality of author-based, content-centered criteria elements 40, such that selecting one of the plurality of selectable fields 62 indicates a selection of one of the author-based, content-centered criteria elements 40. In this way, the user can successfully navigate the system 10 to filter the content items 30.

After filtering, a result 70 of the filtered plurality of selectable fields 60 is displayed on the GUI 54 of the computer device 50 of the user. The result 70 has a portion of the plurality of content items 30 keyed to the plurality of author-based, content-centered criteria elements 40. In the example using books as the content items 30, the result may include a list of the books that match the selectable fields 62 selected by the user. The result 70 may include other information about the book, too, including an image of its cover, a price, and a link to purchasing the book. The result 70 of the filtered plurality of selectable fields can be saved and a name can be identified to the saved result 70, such that the user can retrieve the same result 70 at a later point of time.

Further, in some uses of the system 10, a point value is assigned to each of the plurality of filtered, author-based, content-centered criteria elements 40, and a portion of the content items having the filtered, author-based, content-centered criteria elements 40 can be ranked with one another. Content items 30 not having the filtered, author-based, content-centered criteria elements 40 are omitted from ranking, thereby allowing the ranking to provide accurate results to the user. Specifically, content items 30 may be divided into smaller groups based on the filtered, author-based, content-centered criteria elements 40 for rankings, so that books of very different types are not ranked with each other. This type of ranking may prevent, for example, a book on picking up the pieces after having been in a concentration camp during WW II from being ranked to or compared with teen vampire romance stories, since it is likely that the least popular vampire romance could still be more popular than the most popular post-WW II book. Thus, the system 10 facilitates comparison of content items that have similar features.

Figure 2:
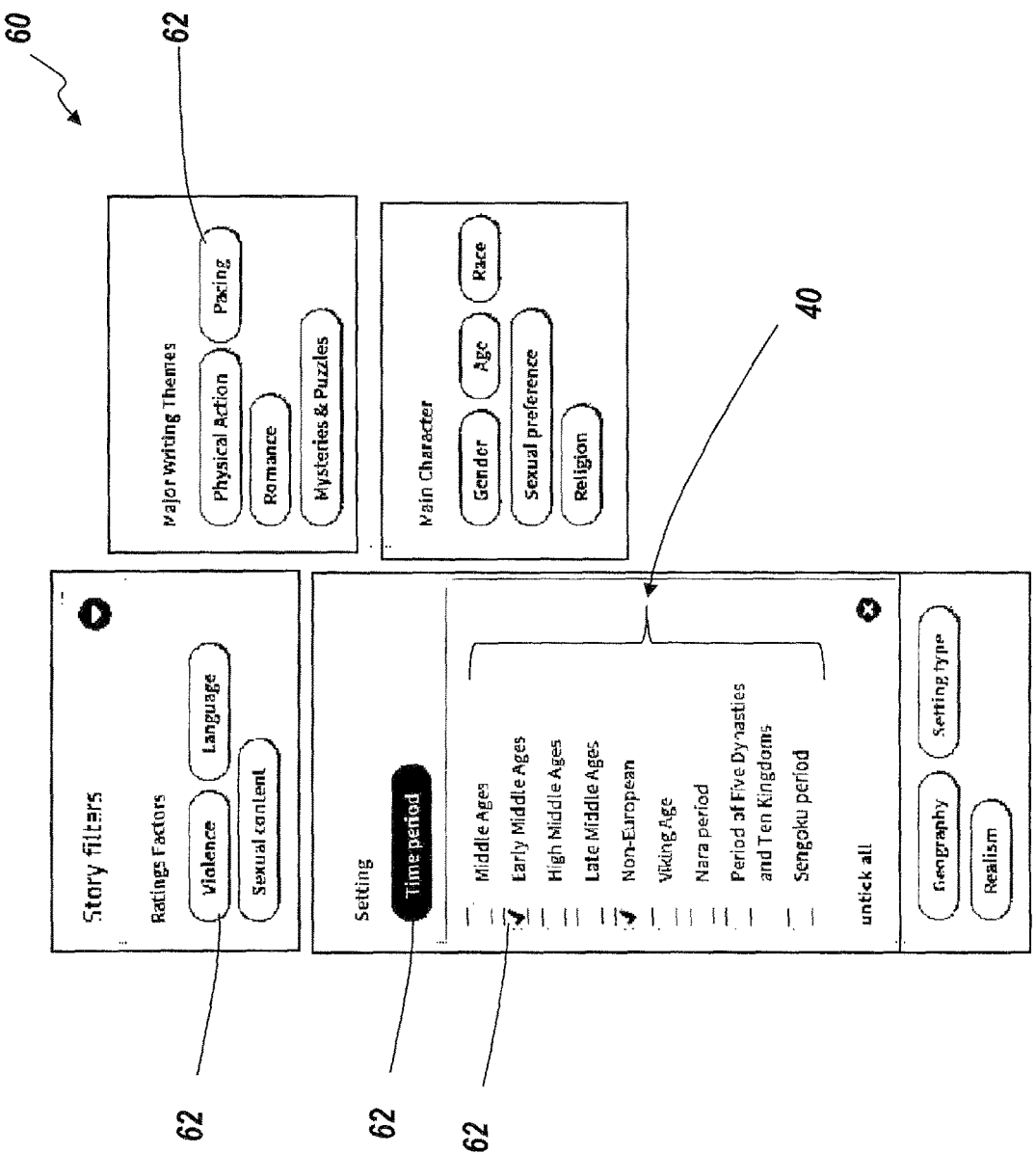
FIG. 2 is a diagrammatical illustration of an input selection field having a plurality of selectable fields which are keyed to the plurality of author-based, content-centered criteria elements for use with the computer-based media content classification and discovery system of FIG. 1.

FIG. 2 is a diagrammatical illustration of an input selection field 60 having a plurality of selectable fields 62 which are keyed to the plurality of author-based, content-centered criteria elements 40 for use with the computer-based media content classification and discovery system 10 of FIG. 1. Relative FIGS. 1-2, the input selection field 60 has selectable fields 62 which are illustrated as selection buttons that are labeled with or near the author-based, content-centered criteria elements 40. In selecting the selectable fields 62, the user may encounter narrowing selectable fields 62. For example, when selectable field 62 marked 'Time period' is selected, the user may then need to select what specific (or general) time period they wish to filter the author-based, content-centered criteria elements 40 by. Once the desired selectable fields 62 are selected, the filtering may retrieve all possible content items 30 which match the selectable fields 62 selected to produce the result 70. If there is a content item 30 that falls outside the selectable fields 62 selected by the user, it may be omitted from the results 70.

It is further noted that users (content consumers) can select one or more selectable fields 62 for each of the author-based, content-centered criteria elements 40. The system 10 will then show all content with matching author-based, content-centered criteria elements 40. Additionally, the system 10 can notify user automatically if new content item 30 is added that matches these search criteria. The user can select which saved author-based, content-centered criteria elements 40 set to use through a drop down, radio button, or other standard selection method. The user can also select an existing title of a content item 30 on the system 10 and add that to his or her list of author-based, content-centered criteria elements 40 searches. It is noted that a user can also require an exact match, or accept that 1 or more of the author-based, content-centered criteria elements 40 don't match. Search results can be set to group results by the number of matching author-based, content-centered criteria elements 40.

FIG. 3 is a flowchart 80 illustrating a computer-implemented method of media discovery, in accordance with a third exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown in block 82, a plurality of content representative identifiers may be stored on a computerized database, wherein each of the plurality of content representative identifiers corresponds to a plurality of content items, respectively, and wherein each of the plurality of content representative identifiers is keyed to a plurality of author-based, content-centered criteria elements, wherein the plurality of author-based, content-centered criteria elements are identified by an author of the each of the plurality of content items. The computerized database is accessed by a user through at least one electronic communication channel (block 84). The plurality of content representative identifiers are filtered, using a processor in communication with the computerized database, using at least one input selection field displayed on a graphical user interface (GUI) of a computerized device of the user, wherein the at least one input selection field has a plurality of selectable fields, wherein each of the plurality of selectable fields matches at least one of the plurality of author-based, content-centered criteria elements (block 86). A result of the filtered plurality of selectable fields is displayed on the GUI of the computer device of the user (block 88). The method may further include a plurality of other steps, processes, and functions, including any disclosed relative to any other figure within this disclosure.

FIG. 4 is a flowchart 90 illustrating a computer-implemented method of media classification, in accordance with the third exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown in block 92, a plurality of author-based, content-centered criteria elements for the content item are identified by an author of a content item. A plurality of content representative identifiers are keyed, using a processor of a computerized device, to each of the plurality of author-based, content-centered criteria elements, whereby the content item is represented by at least one of the plurality of content representative identifiers based on the plurality of author-based, content-centered criteria elements for the content item (block 94). The plurality of content representative identifiers are stored within a computerized database accessible through at least one electronic communication channel, wherein the plurality of content representative identifiers are retrievable based on a search of at least one of the plurality of author-based, content-centered criteria elements (block 96). The method may further include a plurality of other steps, processes, and functions, including any disclosed relative to any other figure within this disclosure.

Also provided in this disclosure is a system for managing and delivering downloadable digital content that rewards authors and content owners using a unique valuation or pricing technique which is correlated to the downloadable activity of the content. As used herein, authors may include and be interchangeable with content owners that may or may not have authored content, including content providers could just as easily be musicians, programmers, or video/film directors—anything that lends itself to digital distribution. In particular embodiments and examples below are a system for delivering digital content using a valuation or price setting formula whereby prices increase as volume of downloads or purchases increases and prices decrease as volumes decrease. Such a system fairly rewards vendors and authors based on the market appeal of their product while simultaneously communicating to buyers that a given product's price has been fairly set by genuine interest from other like-minded customers. In one embodiment, the system correlates price to value in a way that is not currently done by sellers in mass digital markets, defined here as any system offering more products than can be easily browsed and downloaded. These products may be comparable to each other, such as digital games, books, or music of a given genre, and may be offered by different sellers.

Traditional marketing involves price-setting as a function of cost of goods, the producer's desired margin, a string of value-add channel partners along the way, and the marketer's sense on the reaction of the market to price—higher prices may communicate quality, lower prices may enable reaching a different demographic, split pricing may allow one company to flank a competitive product, etc. However, these traditional approaches are not effective in the Mass Double-Sided Digital (MDSD) market, where there are large numbers of both buyers and sellers, but unlike a commodity market, the sellers' products are each unique (i.e., with commodities a pound of flour, beets, or silver from one farmer or miner is interchangeable with a pound of flour or beets from another, but with authored digital content, one punk rock song, poem, or sci-fi novel is not interchangeable with another, even if from the same author). Furthermore, on the production side, the cost of production is insubstantial, channel partners can be removed from all but the sales function (the web store), and promotion is nearly impossible as there is simply not enough available media for the thousands of available products to even reach consumers (iTunes has millions of songs, the App Store has over 200,000 applications as of mid-2010).

This disclosure may be a solution to this modern capitalist conundrum of the digital age, by using a software system to manage the valuation for a large collection of similar items from competing developers or producers available for purchase as digital downloads, where such valuation calculations relative to price may be based on the relative volumes of downloads of each item in a prior time period and further where such valuation values may have a fixed or flexible number of iterations or tiers. The software system may manage the valuation by using algorithms to determine the prices for a web site that offers price information for products available for digital download, and/or set the prices for a retail location that offers products available for digital download (e.g., music stores that let people select songs to make their own CD's).

The system and method disclosed herein may further be used to provide improvements to the distribution of digital content to multiple users positioned remote from one another where the digital content is provided from a centralized server or computerized database. In this type of configuration, it is important to manage the distribution of the content to ensure that distribution is not interrupted, which may occur when the server experiences unmanaged high volumes of download requests, which in turn can cause overloading of the server. The volume of download requests can be attributed to various factors, one of which is the desire of users (those seeking to access the digital content) to acquire the content, which may be based on popularity of the content and price of the content. A digital content item that is popular and priced at an affordable level is more likely to receive higher download requests than one less popular and/or higher priced. Preventing spikes in the volume of download requests is important to ensure proper operation of the distribution of the content. While it can be difficult to manage and control the popularity of digital content items to prevent spikes, it is possible to control and manage the pricing of content to balance against spikes in popularity and thereby prevent spikes in download requests. Thus, server overload and malfunction problems due to spikes in download requests can be prevented and mitigated by the system by managing pricing of the content items.

However, one must be careful in how the pricing of digital content items is managed, in particular, with regards to the frequency of pricing changes. Many conventional systems continuously monitor content distribution activity, commonly with external pricing of the content, and preform rapid price changes in response to detected changes within the distribution of the content. This approach has a tendency to negatively impact the user's experience since constant micro-changes in the pricing of the content leads to large price fluctuations and unpredictability.

To manage the distribution of the content, the system described herein uses a balanced approach which can prevent unwanted server overloading by managing pricing of the content, yet do do in a consumer-friendly way. The system may rely entirely on internal transactional data and, by design, does not engage in rapid price changing, instead performing a single batch run once in a predetermined period, such as once every two weeks, which is done to improve the user experience and customer faith in pricing to increase revenue. Thus, where per-item revenue-maximizing pricing systems rely on constant micro-changes to prices in order to achieve their objective, the system instead seeks to maximize revenue across the entire market it manages instead of per-item, recognizing that customers resent pricing systems that they feel are trying to extract the maximum possible amount of their money for each purchase. Customers prefer and trust a system where prices are set based on relative sales compared to similar products with a fixed and well understood maximum for the most popular items and lower prices for less popular items. Less frequent price changes bring stability to the system, which both reduces processing requirements and also significantly increases aggregate sales.

The system may vary depending on the design of the system, which may be based on the intended use of the system. For example, the system may use a number of pricing tiers to control the price of a content item, but it may be possible for manual override of a pricing tier, such as to change the number of tiers, the pricing on the tiers, or otherwise modify the results of the automatic pricing for any purpose. The system may also use existing digital recording tools to enable content owners or content providers to post various content items directly. The system may include reporting tools for providing usage reports. For example, the system may utilize a reporting tool that shows historical revenue, download volume, etc. across all content items offered for sale. The system may be capable of analyzing any of the reports to provide guidance on future operation of the system, such as by identifying trends with content item purchases or downloads. In one example, it may be beneficial to have a reporting tool that reports revenue of the system based only on the crowd-priced content items.

In one embodiment, the author/creator posts his work to a centralized server. Optionally, the author may set a starting price or a minimum price floor (such non-automatic prices will always be noted as such to the customers). Depending on the market segment, the system features a ranged set of default values that could range from free to the typically accepted upper range for such a product. The system may start with a conservative upper range. For audiobooks this upper range might be, for example, $19.99, and for songs it might be, for example, $1.29, or $8.99 and $0.89, respectively for works from unknown authors or music artists.

A set of stratified pricing values fills the range between lowest and highest. The starting number of steps can vary, but 7 may be the default. Similarly, the differences between them can also vary. Consumers may purchase via download.

If the author was allowed to set the price (step 2 above), consumers can see the price and whether it is the original author's price (in which case they know it has not been set by market interest) or set by the market, pursuant to the system described herein. Prices may be adjusted based on the number of downloads for each title at the current price during the preceding unit of time ($\Delta t$, default is 2 weeks) and the percentage of download volume compared with all other works available in that genre. Once a product's price is adjusted, it is assured that it will stay in its new pricing strata for at least the default unit of time ($\Delta t$).

In one example, the default is that the percentile breaks would be logarithmic based on volume, but optionally could be evenly spaced linearly, follow some other formula, or even be selected manually. These could also optionally be stratified by genre, recognizing that some categories may be smaller, but still comprise a market segment willing to pay more for quality work (e.g., historical audiobooks could be compared only with other historical audiobooks, rather than with all audiobooks). Other non-default options include a longer trailing period of volume calculation to reduce pricing volatility.

In another example, if the number of purchases at the top tier is more than a defined amount relative to the next lower tier (default is half), another higher tier is added automatically setting the volume limit for that tier to be the top segment as defined (default is the top third). The actual dollar amount of the increase could either be $1, any other set increase amount, the next step in a pre-defined set of tiered pricing, or functionally calculated based on the previous tiers (e.g., previous top tier+20%). In one example, the tiers may range from the bottom 50%, which are set to be free, to the top 1% tier, which are set based on market standard pricing for a popular/best seller in that genre, and the tiers between the bottom and the top may be priced between the prices of the bottom and top tiers.

Referring now to the figures, examples of systems and methods of downloading and managing the distribution of digital content according to the broad disclosure are provided. In any of these examples, the particular process steps are set forth for illustration, and those skilled in the art will understand that the process steps may or may not be performed in the particular order as illustrated in the figures or as described below.

Figure 5A:
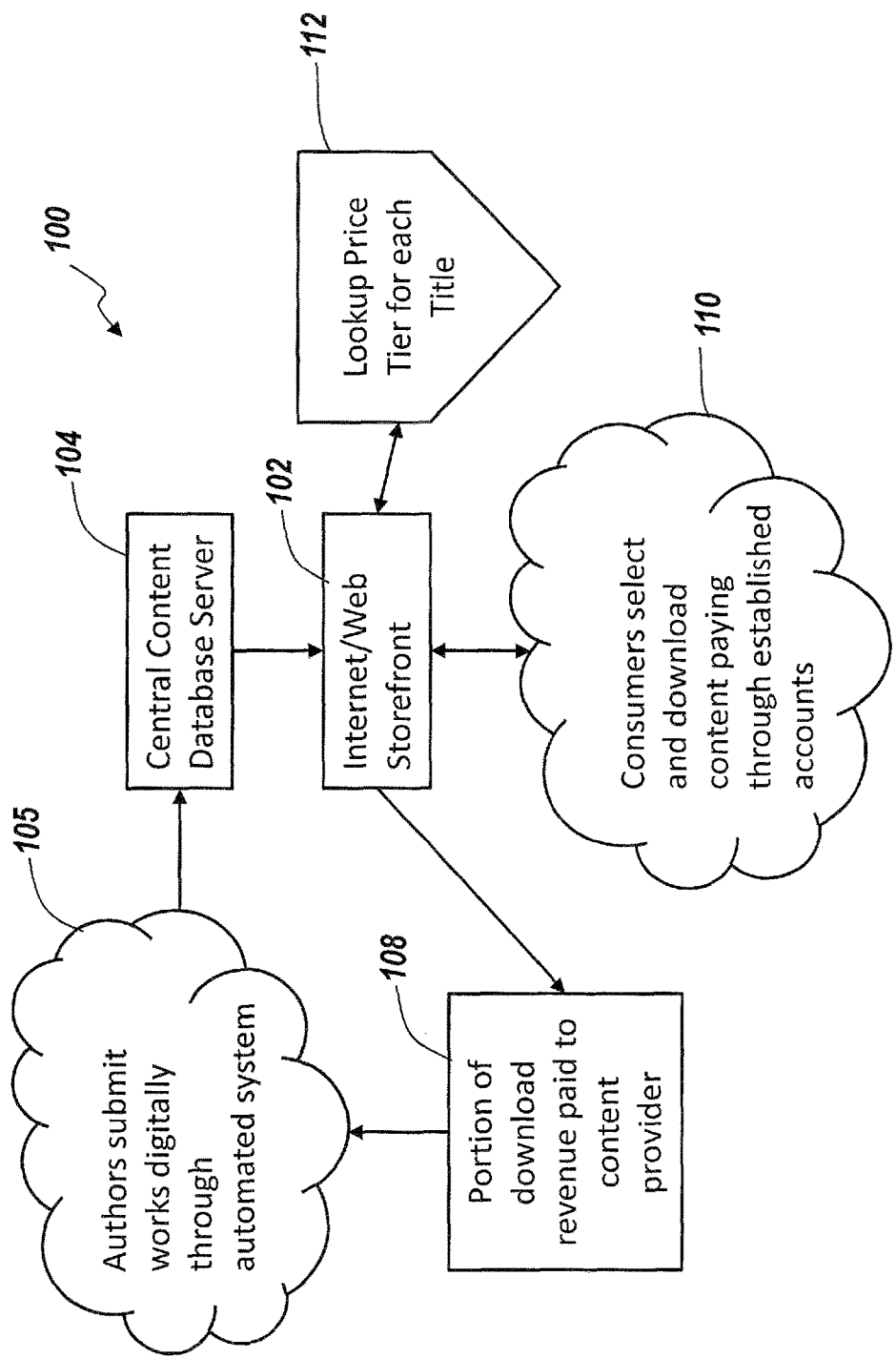
FIG. 5A is a schematic illustration of a system for digital content pricing, in accordance with a first exemplary embodiment.

FIG. 5A shows a diagrammatical flow chart for a system configured according to the disclosure. As can be seen, the system 100 includes a computerized architecture having an Internet storefront 102 operated using a software application which is frequented by human users using computing devices through a network, such as the Internet, to purchase digital content online. The storefront 102 is configured to receive content from a central content database 104, where authors store or otherwise submit works that are digitally formatted and submitted via an automated system 106, such as web uploading, email transfer, FTP site, or other means. Once a user purchases an author's content, a portion of the downloaded revenue is paid to the author or content provider via a payment module 108. This may be either immediately per transaction or in batches on a weekly, monthly, or other basis. In operation, the store then looks up the price via an algorithm 112 that establishes valuations or prices for each content title or content product, and provides the storefront the price for sale based on the market behavior of the product. The users, through their individual computing devices, 110 select and download content, paying through established accounts with the web store or a third party.

Figure 5B:
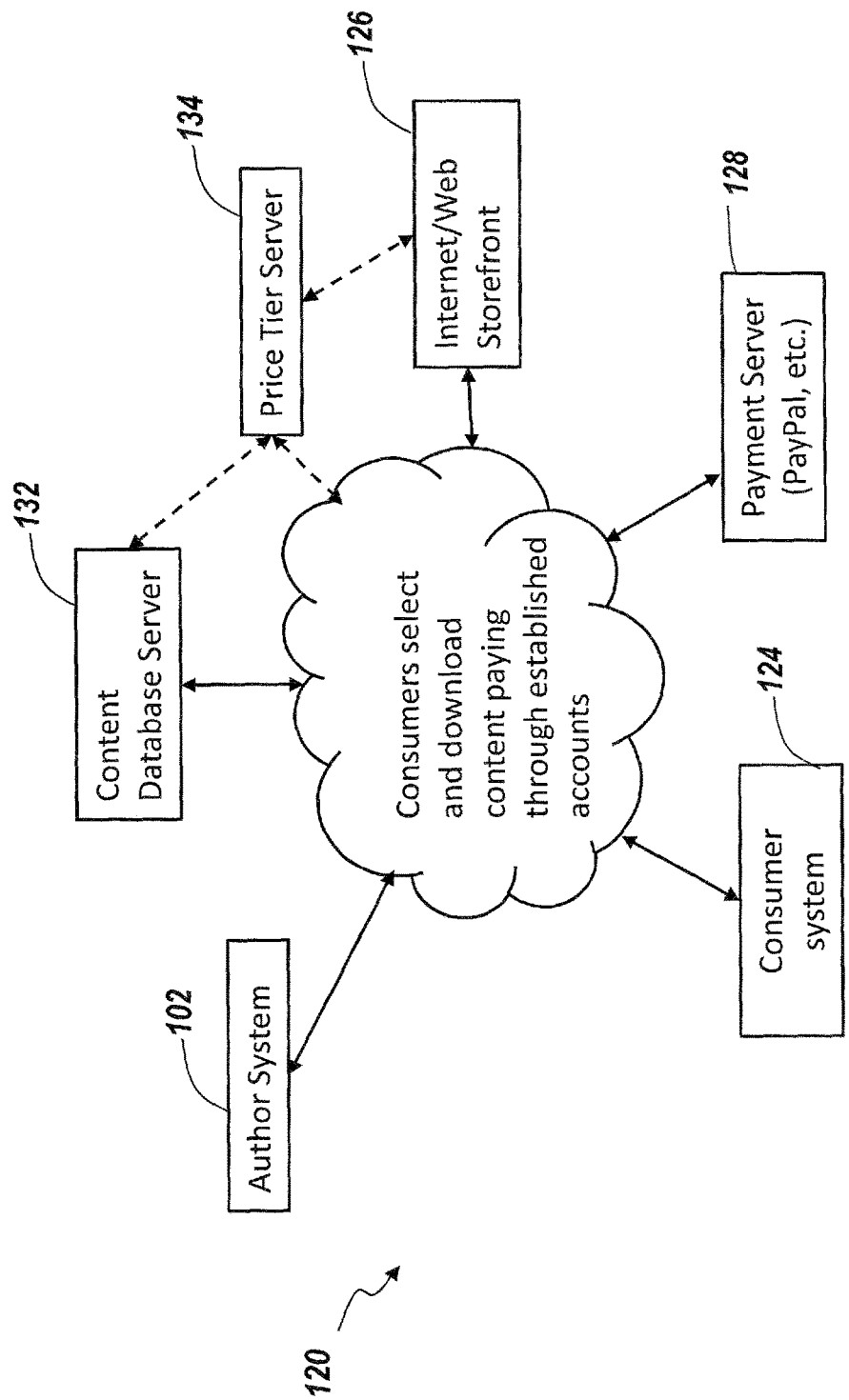
FIG. 5B is a schematic illustration of network architecture for a system for digital content pricing, in accordance with the first exemplary embodiment.

FIG. 5B shows a general network architecture for a system configured according to the disclosure. The Internet and other networks 122 are the center of the marketing infrastructure, and these allow consumer systems 124 to access other entities on the Internet such as Internet/web storefront servers 126. Payment entities 128 and other entities, may be utilized by the buyers and sellers to buy and sell content via the internet, allowing a user to purchase content without the need to physically enter a store to purchase and pickup a physical device or storage device that has content stored thereon. According to the disclosure, an authoring compensation system may be provided via a system that includes an author system 130, which may simply be another user or content provider (whether or not an actual author, the content may be owned by a content provider that may not in fact be a content owner, and the content providers could just as easily be musicians, programmers, or video/film directors—anything that lends itself to digital distribution) that is uploading content for sale to other users. The author system may upload content to a content database 132 for storage to be later downloaded to consumers via storefronts or other means to enable a sale of the content to the user and later compensation to the storefront and the author. According to one embodiment, a valuation or price server 134 may be included to set prices for the content based on purchase behavior. The price server may be a separate entity that communicates directly with the internet or other networks 122, or it may be incorporated in other entities such as the content database server 132, the internet storefront 126, the payment server 128, or other entities, and other combinations and permutations of these and other entities may be incorporated into a single entity without departing from the disclosure as claimed. In fact, all three of these entities and other entities may be incorporated together in one physical entity to perform the desired operations according to the disclosure.

With reference to FIGS. 5A-5B, the lookup valuation or pricing module 112 may use algorithmic processing to determine the position of the digital media content within the valuation or pricing tiers. The algorithmic processing employs code-based instructions which may be run on a T2 large instance having Burstable Performance Instances that provide a baseline level of CPU performance with the ability to burst above the baseline. T2 large instances can sustain high CPU performance for long periods of time during workload application, while providing ample performance. A baseline performance and ability to burst may be governed by CPU Credits, which may be received continuously at a set rate based on instance size and may be accumulated and consumed as needed. Accordingly, the T2 instance provides the system with quality and reliable micro-services, low-latency interactive applications, and small and medium databases, which allows the system to carry out the processing efficiently and without interruption. The T2 instance includes an Intel AVX† processor and/or an Intel Turbot processor, up to 3.0 GHz Intel scalable processor, use cases, as well as websites and web applications, development environments, build servers, code repositories, micro services, test and staging environments, and line of business applications.

The system may further include a plurality of Lambda tasks, e.g., a fully managed compute service that runs the necessary code in response to events generated other code events or user events. The Lambda tasks may include, but are not limited to, task directors such as:
Fix collision on event.source
Update to the latest fixer.io.api
Allow for ranged lookback
Check for existence before grabbing from s3
Update VPC
Valuation (pricing)

These Lambda tasks may be run as NodeJS using 128 MB. It is noted that other tasks may also be run, as may be included depending on the further design, implementation, and/or functionality of the system.

Figure 6A:
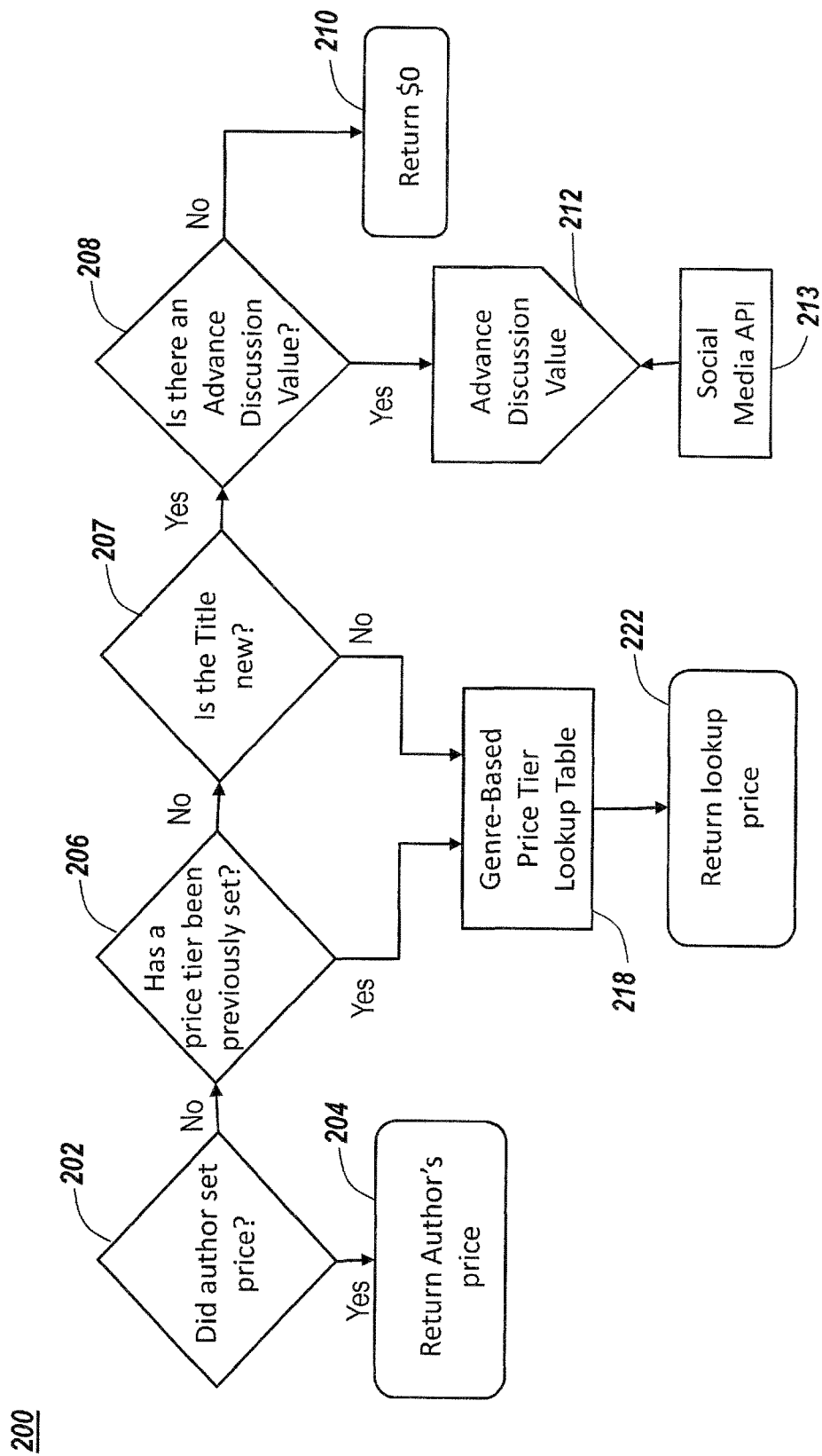
FIG. 6A is a flow chart for a method of digital content pricing, in accordance with a fourth exemplary embodiment.

FIG. 6A shows a flow chart for a method of looking up a price tier for a digital download product that includes pricing methods for use in a system configured according to the disclosure. It is noted that the price tier is determined or selected for each type of content, medium or sub-medium, such that like Titles are tiered against each other and dissimilar Titles are not tiered against each other. For example, music, software, books, and visual works may be tiered separately from one another, so the system does not tier books to music, for example. Even within individual mediums, e.g, within books, it is noted that books should be tiered against like-books, such that text books are tiered with other text books and fiction books are tiered with other fiction books. In accordance with this disclosure, the selection or assignment of a price tier may be done with each particular type of content medium.

The system 200 starts in step 202, where it is queried whether the author has set a price. In one embodiment, the author may not be allowed to set the price, but will be subject to automatic price tier setting in the system. There is also a hybrid—where the author sets an initial price, but after that, the system takes over. In effect, in such an embodiment, it would only go to step 204 if it's within the original Δt.

In one embodiment, Δt may be set by default to be 2 weeks. The price tiers change every 2 weeks. It could also be set to change not after a fixed period of time elapses, but more rapidly if the download rate is sufficient to justify it (e.g., if in 1 day a given title receives as many downloads as a title from the tier above it received in the prior 2-week period, it could be immediately upgraded to the next higher tier).

If the author has set a price, it is returned in step 204, typically to the storefront for display or delivery to a prospective purchaser. If not, the process queries in step 206 whether a price tier has previously been set by an author, whether the same, similar or a different author and whether the same, similar or different product. If it has been previously set by a previous pass through the subroutine, then a genre-based price tier lookup table is queried in step 218. It is noted that the genre-based price tier lookup table may use one or more of a plurality of content representative identifiers with each of the Titles, where each of the content representative identifiers may corresponds to at least one of a plurality of author-based, content-centered literary criteria elements assigned within literary criteria categories. The plurality of author-based, content-centered literary criteria elements may be identified by an author of the each of the Titles. Additionally, the literary criteria categories may include: a rating factor of the digital file; a setting of the digital file; a style of the digital file; a theme of the digital file; and a main character characteristic of the digital file, among others, as described relative to FIGS. 1-4 of this disclosure. It is noted that the operation and functioning of the genre-based price tier lookup table is described in detail relative to FIG. 6B Then, the lookup price tier for each title is returned in step 222. It is again noted that the price tier is for a content type and is selected from a table specific to the title's master genre (e.g., songs, novels, short stories) and based on the title's ranking within its specific genre (e.g., vampire romance novels, hard sci-fi novels, historical fiction novels), such as by means of one such example, in this case for books:

TABLE 1

Price Tier for Content Type

| Ranking % | Books | Novellas | Shorts | Flash |
|---|---|---|---|---|
| 50.00% | $— | $— | $— | $— |
| 25.00% | $0.29 | $0.29 | $0.24 | $0.09 |
| 10.00% | $0.49 | $0.49 | $0.39 | $0.14 |
| 5.00% | $0.99 | $0.89 | $0.69 | $0.19 |
| 4.00% | $2.99 | $1.99 | $0.99 | $0.29 |
| 3.00% | $4.99 | $2.99 | $1.49 | $0.49 |
| 2.00% | $6.99 | $3.99 | $1.99 | $0.79 |
| 1.00% | $8.99 | $4.99 | $2.99 | $0.99 |

Referring back to step 206, if the price tier has not previously been set, then there is a query whether the Title is new in step 207. If no, the Titles are ranked and tiered in step 214. If the Title is new, then there is a query whether there is an advance discussion value in step 208. If there is advanced discussion, then the advance discussion value is returned in step 212. The advance discussion value of step 212 may be derived through algorithmic processing of social media data received through a Social Media API in step 213. In accordance with this disclosure, higher than not normal discussion on or attention to a particular or popular topic may be referred to herein as 'advance discussion' or 'buzz' and when this discussion or attention is present on a social network it may be referred to as 'social network buzz.' Social network buzz may be determined by an analysis of the topics discussed within a social network system, which may be fed into the system through the Social Media API 213. The buzz or advance discussion may be quantified into a value, such as a binary or numerical value. For example, the system may identify a book that has been heavily discussed on social networking partner sites, e.g., the Twilight or Harry Potter books, to identify these items as having advance discussion value or social networking buzz. The system may monitor advanced discussion value content items to assist with determining a starting price tier of the content item (other than a free or a bottom tier price).

In one example, tracking titles as keywords on a social network allows a system to see that a given title is receiving a lot of buzz in advance of its release and therefore should not start with a $0 price tier. For example, if there were another Harry Potter book about to be released, advance discussions on Facebook® would occur. Based on the number of such references, the system could set a starting price tier from the table for a novel, say $6.99 or $8.99. If not in step 206, then $0.00 is returned as the value in step 210.

It is noted that the genre-based prices lookup table may vary depending on various circumstances, including the type of content item being priced. For example, the price tiers provided in table I may be accurate for all fictional genres at a given period of time. However, these price tiers may be changed over time, such as due to inflation, market changes, etc. In another example, non-fiction content items, such as text books, may be priced differently from works of fiction, since textbooks generally cost more than novels. Poetry and other divergent genres may also have differing price tiers. For all content items, it is beneficial—but not strictly required—that the top tier for any genre would be priced comparably to market established prices for best sellers. All other tiers are set to be tiered down from that top price tier.

It is important to note that because this pricing system uses a table, the price tiers may not vary by a formula, but rather a lookup on the table, such that the tier prices themselves are set by a marketing team. This configuration allows for pricing to be competitive and incorporate consumer-buying attributes, such as having all price tiers end in a '9'. While such a team setting a price tier for an individual book may indeed maximize profits for that book in a vacuum, it may also weaken the market as a whole, including the prospective revenue for top performing titles. Accordingly, the present disclosure may maximize the total transactions of the marketplace by building trust, which in turn provides a larger pool of total revenue to be divided among titles of interest. It is noted that formula-based pricing systems can be used within this disclosure in place of or in cooperation with a table-based look-up system.

Further, it is noted that while the pricing tiers may be largely controlled by the system, it is possible for authors (or other content providers) to set their own price tiers for their content items. Allowing the content providers to set their price tiers may be important in allowing consumers and users of the system to see that the system has high integrity in providing content items at competitive prices. If a content owner did set the price tier of their content item, this fact may be conveyed to the user of the system, thereby allowing him or her to know which titles are crowd-priced, i.e., priced by the system or priced using pricing tables, and which are provider-priced by the content provider. Any combination of crowd-pricing and provider-pricing may be used with the system.

Figure 6B:
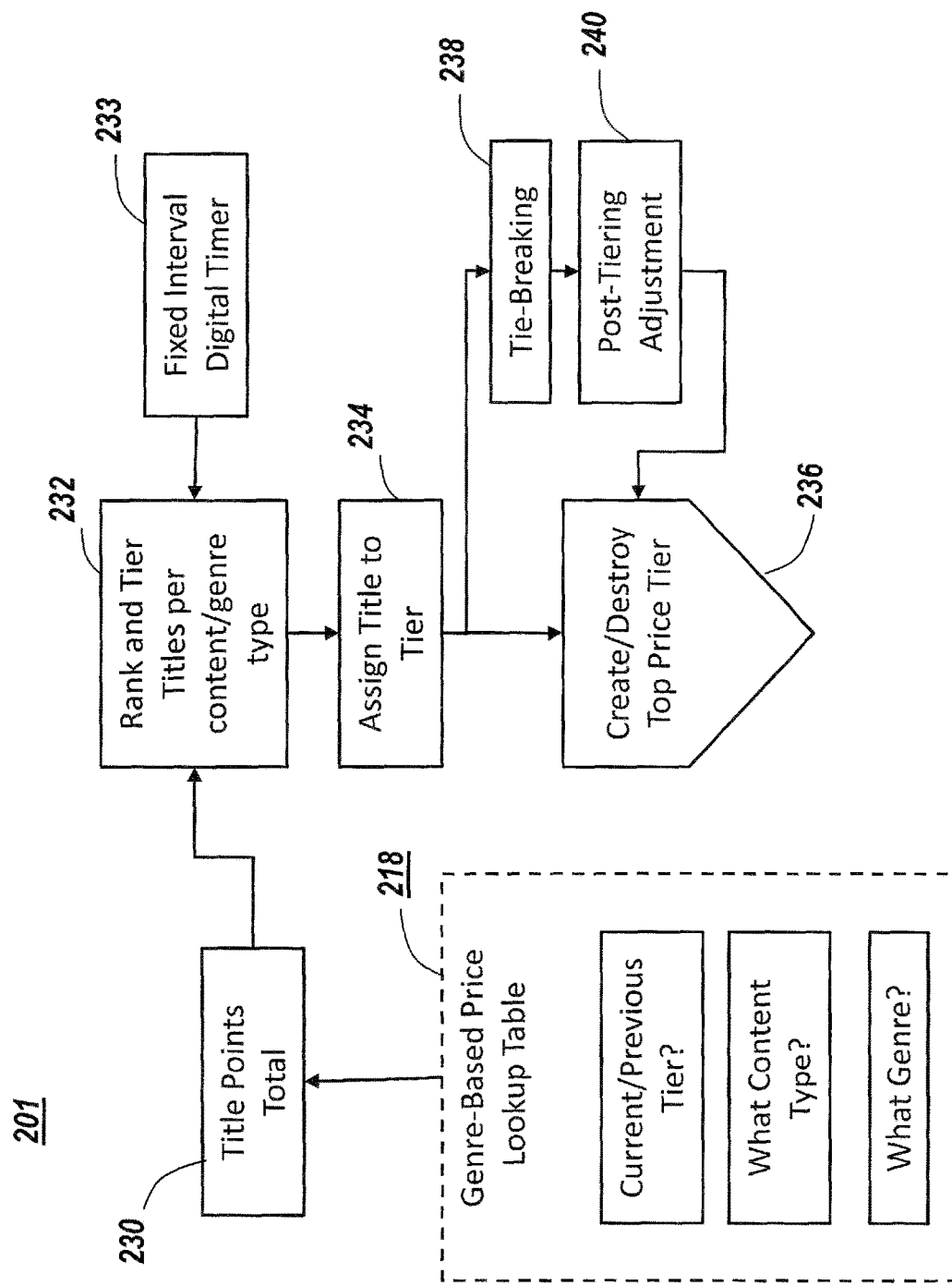
FIG. 6B is a flow chart for a method of digital content pricing, in accordance with a fourth exemplary embodiment.

FIG. 6B shows a flow chart for a method of ranking and tiering a digital download product that includes pricing methods for use in a system configured according to the disclosure. The system 201 starts in step 230 where each Title is assigned a point total using the algorithmic functionality described in this disclosure. The assignments of points may occur every 2 weeks on a particular day, or in accordance with another time interval. The assignment of points may be derived by multiplying the number of sales at each tier of the Genre-Based Price Lookup Table 218 in each period by the corresponding number in the table below, then summing all of those products.

A first exemplary points table for the subject system is provided:

TABLE 2

| | Completed Evaluation Period | Prior Evaluation Period | 2nd Prior Evaluation Period | 3rd Prior Evaluation Period | 4th Prior Evaluation Period | 5th Prior Evaluation Period | 6th Prior Evaluation Period | 7th Prior Evaluation Period |
|---|---|---|---|---|---|---|---|---|
| Free | 1 | 0 | 0 | 0 | 0 | 0 | 0 | 0 |
| Tier 1 | 10 | 3 | 0 | 0 | 0 | 0 | 0 | 0 |
| Tier 2 | 15 | 5 | 3 | 0 | 0 | 0 | 0 | 0 |
| Tier 3 | 20 | 10 | 5 | 3 | 0 | 0 | 0 | 0 |
| Tier 4 | 25 | 15 | 10 | 5 | 3 | 0 | 0 | 0 |

TABLE 2-continued

|  | Completed Evaluation Period | Prior Evaluation Period | 2nd Prior Evaluation Period | 3rd Prior Evaluation Period | 4th Prior Evaluation Period | 5th Prior Evaluation Period | 6th Prior Evaluation Period | 7th Prior Evaluation Period |
|---|---|---|---|---|---|---|---|---|
| Tier 5 | 30 | 20 | 15 | 10 | 5 | 3 | 0 | 0 |
| Tier 6 | 40 | 25 | 20 | 15 | 10 | 5 | 3 | 0 |
| Tier 7 | 50 | 35 | 25 | 20 | 15 | 10 | 5 | 3 |

A second exemplary Points Table for sales through e-Book distribution channels is provided:

TABLE 3

|  | Completed Evaluation Period | Prior Evaluation Period | 2nd Prior Evaluation Period | 3rd Prior Evaluation Period | 4th Prior Evaluation Period | 5th Prior Evaluation Period | 6th Prior Evaluation Period | 7th Prior Evaluation Period |
|---|---|---|---|---|---|---|---|---|
| Free | 1 | 0 | 0 | 0 | 0 | 0 | 0 | 0 |
| Tier 1 | 10 | 3 | 0 | 0 | 0 | 0 | 0 | 0 |
| Tier 2 | 15 | 5 | 3 | 0 | 0 | 0 | 0 | 0 |
| Tier 3 | 20 | 10 | 5 | 3 | 0 | 0 | 0 | 0 |
| Tier 4 | 25 | 15 | 10 | 5 | 3 | 0 | 0 | 0 |
| Tier 5 | 30 | 20 | 15 | 10 | 5 | 3 | 0 | 0 |
| Tier 6 | 40 | 25 | 20 | 15 | 10 | 5 | 3 | 0 |
| Tier 7 | 50 | 35 | 25 | 20 | 15 | 10 | 5 | 3 |

A third exemplary Points Table for sales through Audio-book Distribution Channels is provided:

TABLE 4

|  | Completed Evaluation Period | Prior Evaluation Period | 2nd Prior Evaluation Period | 3rd Prior Evaluation Period | 4th Prior Evaluation Period | 5th Prior Evaluation Period | 6th Prior Evaluation Period | 7th Prior Evaluation Period |
|---|---|---|---|---|---|---|---|---|
| Free | 48 | 0 | 0 | 0 | 0 | 0 | 0 | 0 |
| Tier 1 | 48 | 0 | 0 | 0 | 0 | 0 | 0 | 0 |
| Tier 2 | 48 | 0 | 0 | 0 | 0 | 0 | 0 | 0 |
| Tier 3 | 48 | 0 | 0 | 0 | 0 | 0 | 0 | 0 |
| Tier 4 | 50 | 0 | 0 | 0 | 0 | 0 | 0 | 0 |
| Tier 5 | 52 | 0 | 0 | 0 | 0 | 0 | 0 | 0 |
| Tier 6 | 53 | 0 | 0 | 0 | 0 | 0 | 0 | 0 |
| Tier 7 | 54 | 0 | 0 | 0 | 0 | 0 | 0 | 0 |

It is noted that the exemplary tables provided herein may be subject to change based on market data or other factors. It is also noted that partners and/or partner-users of the system described herein, may all be able to have their own distinct table for points per transaction. The only difference currently between the first and second exemplar tables, above, is currently at the Free tier, where those sales are worth 1 point on the subject system's platform and ⅒ of a point through distribution. This is because there are bots that drive large numbers of free downloads of books on large platforms, such as Amazon.com, independent of actual reader interest.

Next, at step 232, all of the Titles are ranked within the same grouping from the one with the least points to the one with the most points. Groupings use story elements of each of the Titles, and other factors like length and language to group books for comparative ranking. This ensures that the system is ranking like-Titles against each other; so for example, a Sci-Fi book doesn't get ranked against a text book. Ranking and tiering the Titles may be set to run autonomously at a fixed time using a digital timer set with a fixed interval in step 233.

Next, at step 234, all of the Titles are assigned to tiers following ratios, such as, for example, the following ratios:

TABLE 5

| Percentile Ranking by popularity w/in genre | Share of Titles | $CP Tier # |
|---|---|---|
| 98.6% to 100.0% | 1.4% | $CP Tier 7 |
| 91.0% to 98.6% | 7.6% | $CP Tier 6 |
| 80.0% to 91.0% | 11.0% | $CP Tier 5 |
| 66.7% to 80.0% | 13.3% | $CP Tier 4 |
| 50.0% to 66.7% | 16.7% | $CP Tier 3 |
| 30.0% to 50.0% | 20.0% | $CP Tier 2 |
| 0.0% to 30.0% | 30.0% | $CP Tier 1 |

Then, at step 236, a call to the create/destroy top price tier subroutine is performed to assess whether to split the current top tier and add a new one, or remove the top tier, merging its members with the former second tier.

It is noted that the Titles may be ranked using both points and secondary factors. For example, after all Titles have been assigned a point score, it is entirely possible that several Titles will have the same number of points as each other. In these cases, a tie breaker is needed, as illustrated at step 238. Then, a final post-tiering adjustment at step 240 can be performed so that no Title falls by more than one tier from its prior value. This can result in the total number of Titles in a Tier not exactly matching the percentages shown above, which is acceptable. A variety of secondary attributes may be used for these tie-breakers. With respect to tiering, these attributes are only for tie-breaking books with the same number of points and do not otherwise affect ranking.

A first type of tie breaker may be a cumulative number of sales at each tier. The system may keep a permanent record of the number of sales of every Title at every tier. This is time independent, so an older Title will have more than a newer Title.

As a secondary factor, secondary points may be calculated for this count as follows:

TABLE 6

| Tier | Multiplier |
|---|---|
| Free | 0 |
| 1 | 1 |
| 2 | 10 |
| 3 | 100 |
| 4 | 1000 |
| 5 | 10000 |
| 6 | 100000 |
| 7 | 1000000 |

To provide an example of the points calculate, a book with 34 downloads at Free, 78 at Tier 1, 40 at Tier 2, and 17 at Tier 3 would have: $(34 \times 0)+(78 \times 1)+(40 \times 10)+(17 \times 100)=2,178$ secondary points.

A second type of tie breaker may be based on an amount of time a Title has been with the system. Especially with Titles with very small numbers of downloads, where all downloads may be clustered at the Free and bottom tier(s), it would still be possible for a tie based on number of sales at different tiers. As a tertiary factor and final tie-breaker, older books may be simply ranked higher than newer books. If there are books with an equal number of points based on recent $CP sales and an equal number of secondary points from cumulative sales, the older book would rank higher than the newer book. This means that if these books end up straddling a tier boundary, the older book would end up in the higher, more expensive tier, and the newer book would be in the lower, less expensive tier.

To provide further clarity relative to new Titles, as discussed relative to FIG. 6A-6B, it is noted that if there are no sales of the Title yet, because it's new to the system, then the Title has never been ranked, and the Title (book, song, video, or software, or the like Title) will be in the bottom Tier. While there's still a lookup function for the new Title, it's just to get the price for the bottom tier at which the Title will start. For books in particular, different categories of books by content and length may have different prices for each tier. For example, a short story's $CP Tier 1 (bottom tier) may be $0.25, a novel's $CP Tier 1 may be $0.29, and a Text Book's $CP Tier 1 may be $2.99. Further, one further step may be for a Title to start as free and remain at free for up to three (3) Tiering (pricing) periods if the Title is in the bottom tier during each of those periods. If the Title gains enough downloads at free to rise above $CP Tier 1 (bottom tier), then the Title will immediately cease to be free adopt the price of its resulting tier from the lookup table. If it then falls back to $CP Tier 1, it will not again become free. The Title is only free until it moves above Tier 1 or after 3 Tiering periods, whichever comes first.

One of the benefits of the system and method as disclosed herein, relative to other systems, is that the Titles in the present disclosure are never priced based on market interest. In contrast, other systems may have dynamic pricing systems, but they price the digital titles based on market interest. The system and method of the subject disclosure uses fixed prices for each tier and ranks the digital Titles so they can be allocated to the correct tiers (e.g., 30% of titles go in $CP Tier 1, 20% in $CP Tier 2, 17% in $CP Tier 3, etc. through 1.4% in $CP Tier 7). The algorithms used in the subject system and method are formulated for ranking alone, and not price. After ranking, each Title gets whatever price it gets based on the tier in which it falls, e.g., through the lookup table.

Figure 7:
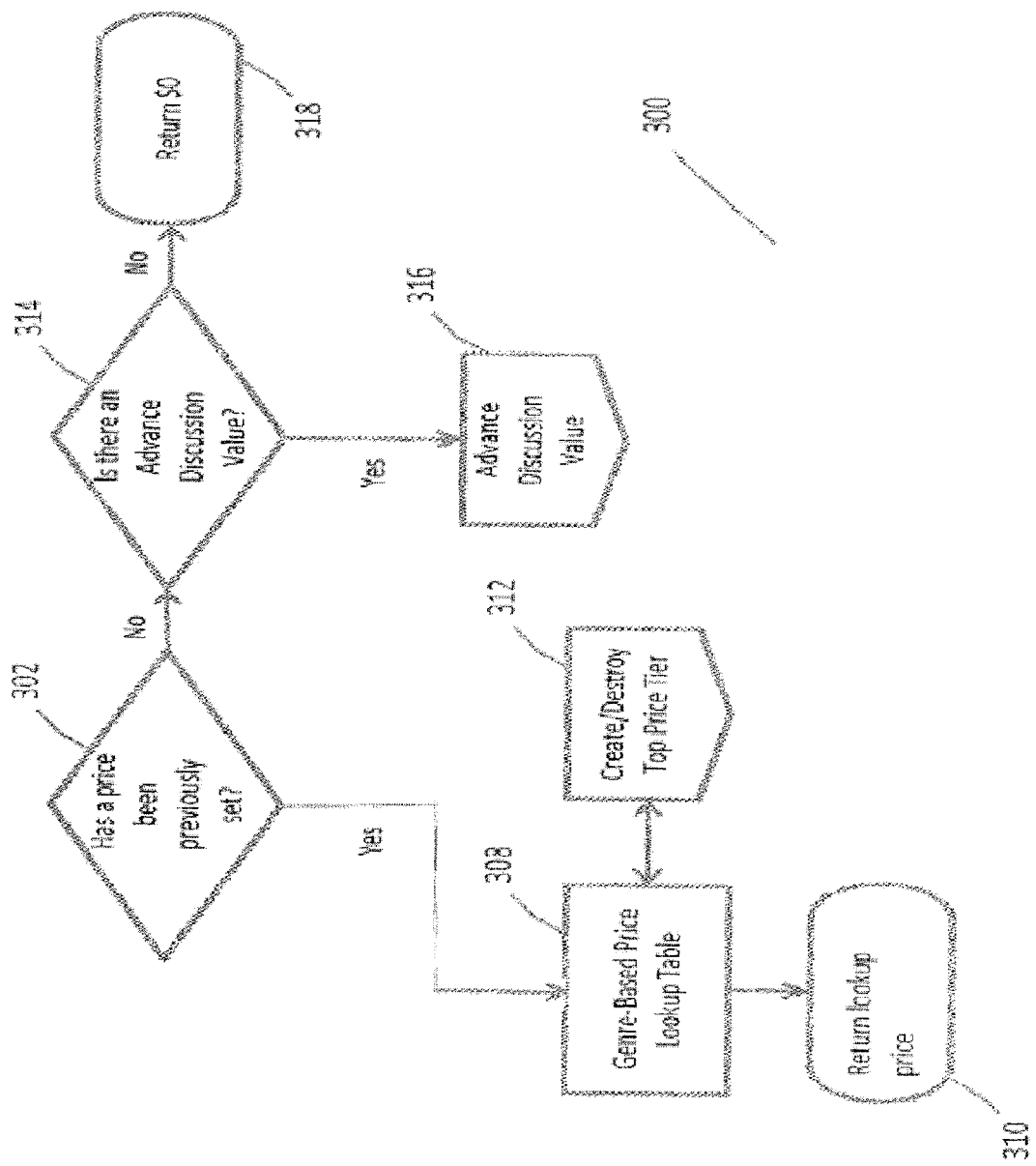
FIG. 7 is a flow chart for a method of digital content pricing, in accordance with the fourth exemplary embodiment.

FIG. 7 shows a flow chart 300 for a method for use in a system configured according to the disclosure. In step 302, it is queried whether a price tier has previously been set. If a minimum time has passed then a genre-based price lookup table is queried in step 308. A create/destroy a top rice tier process is performed in step 312, and the lookup price is returned. Back to step 302, if a price tier has not been previously set, then in step 314 it is queried whether there is an advanced discussion value that would set an initial price tier. If yes, then the advance discussion value is retrieved and used for the initial price tier in step 316, and if not, then $0.00 is returned in step 318.

The minimum time used within the process may vary, and any period of time may be selected as the minimum time. For example, a standard minimum time may be 2 weeks. However, depending on the content item or the provider of the content item, the minimum time may be 1 month, because they lesser minimum time periods are too quick. For certain content items, such as news reports where the appeal is very time dependent and fades quickly as it ages, the minimum time frame could be a small number of days or even hours. For example, if lots of aspiring reporters were writing about the verdict in a murder case, the price tiers for access to those articles may be set within hours, since longer periods of time may significantly decrease the value of the content item.

For certain content items, such as periodicals or other time-sensitive reporting, an alternative approach could be to treat all works by the author in the aggregate. For example, reporter A's new reports are always popular, so her new works appear in a higher tier. Reporter B's stories are not as popular and so her works don't start in as high a tier. In this case, the re-tiering may be back to the bi-weekly or monthly rate, but instead of applying per title, it would apply to all "news stories" in the news genre (i.e., murder trial coverage). A similar differential option may be applied to periodicals to set a monthly or annual subscription price.

Figure 8:
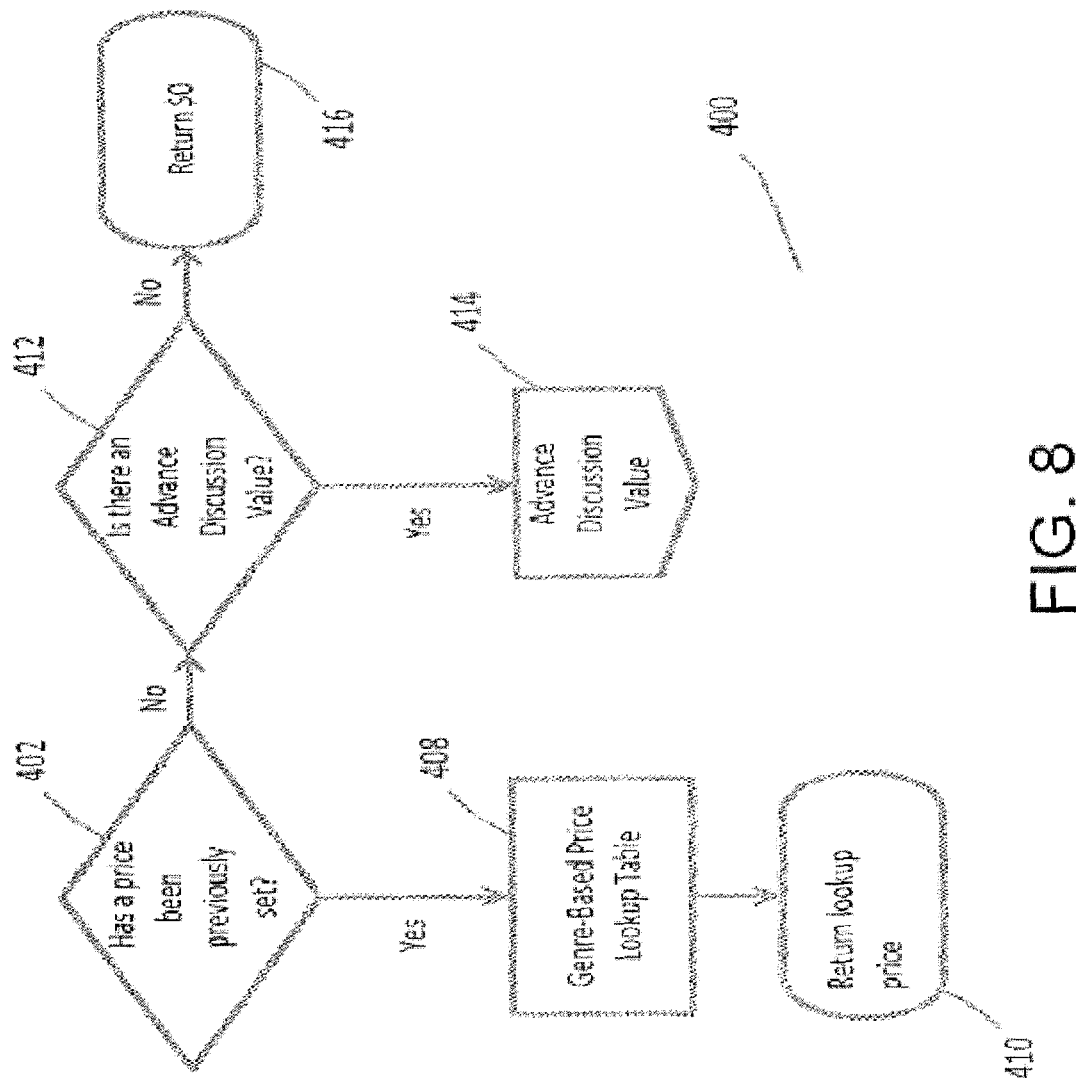
FIG. 8 is a flow chart for a method of digital content pricing, in accordance with the fourth exemplary embodiment.

FIG. 8 shows a flow chart 400 for a method for use in a system configured according to the disclosure. In step 402, it is queried whether a price tier has previously been set in step. If a minimum time has passed then a genre-based price lookup table is queried in step 408 and a lookup price is returned in step 410. Back to step 402, if a price tier has not been previously set, then in step 412 it is queried whether there is an advanced discussion value that would set an initial price tier. If yes, then the advance discussion value is retrieved and used for the initial price tier in step 414, and if not, then $0.00 is returned in step 416.

Figure 9:
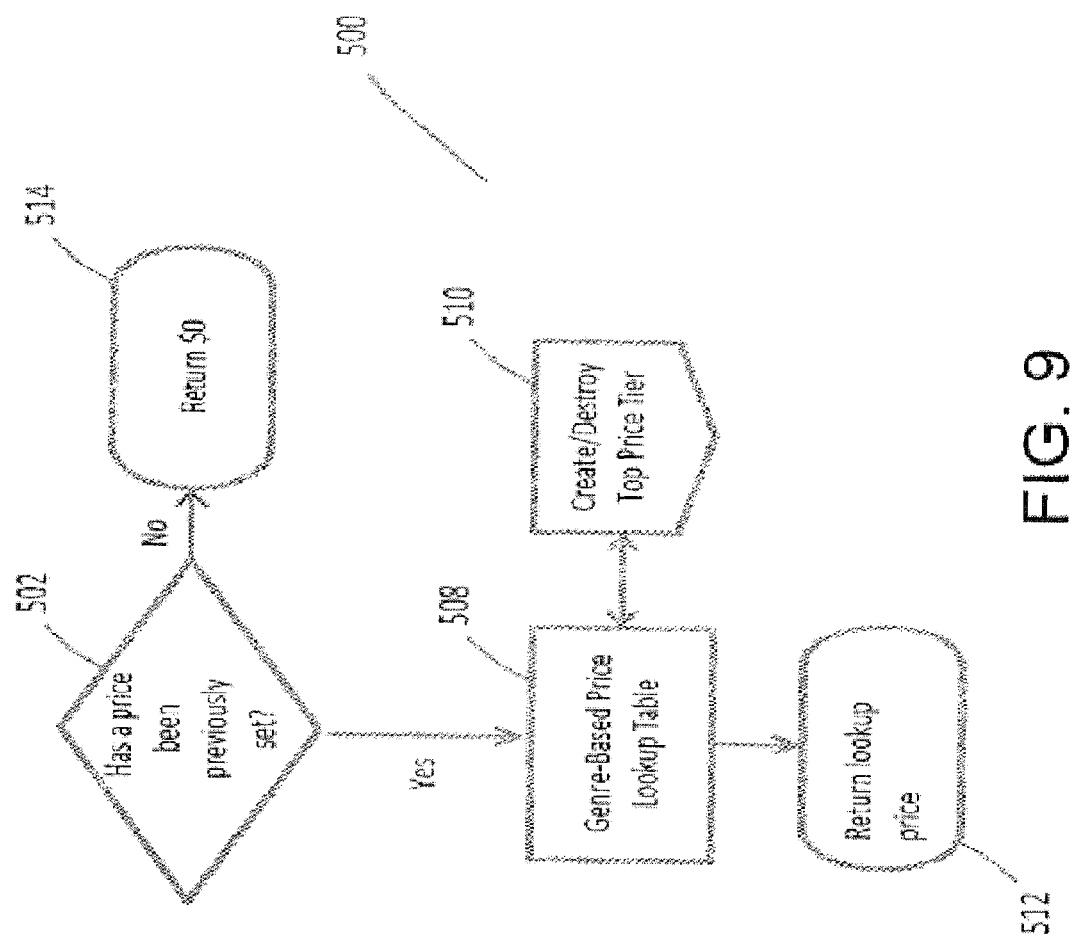
FIG. 9 is a flow chart for a method of digital content pricing, in accordance with the fourth exemplary embodiment.

FIG. 9 shows a flow chart for a method for use in a system configured according to the disclosure. In step 502, it is queried whether a price tier has previously been set in step. If a minimum time has passed then a genre-based price lookup table is queried in step 508, a create/destroy top price tier is done in step 510 and a lookup price is returned in step 510. Back to step 502, if a price tier has not been previously set, then in step 514 $0.00 is returned.

Figure 10:
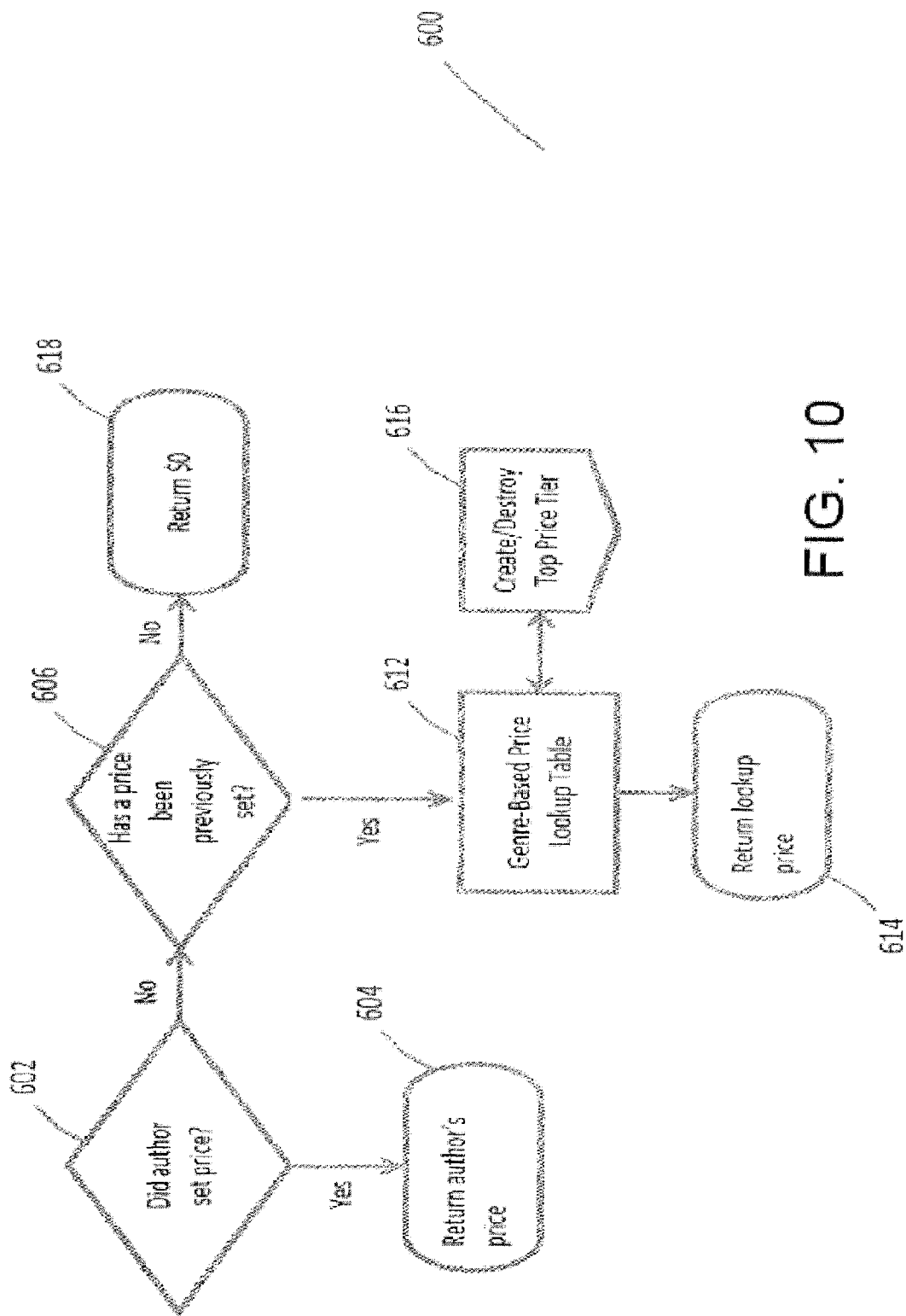
FIG. 10 is a flow chart for a method of digital content pricing, in accordance with the fourth exemplary embodiment.

FIG. 10 shows a flow chart for a method for use in a system configured according to the disclosure. In step 602, it is queried whether the author set the price tier. If yes, then the author price tier is returned in 604. If not, then it is queried whether the price tier has previously been set in 606. If no, then $0.00 is returned in 618. Then a genre based price lookup table process is done in step 612, a create/destroy top price tier is performed in step 616, and the lookup table price is returned in 614.

Figure 11:
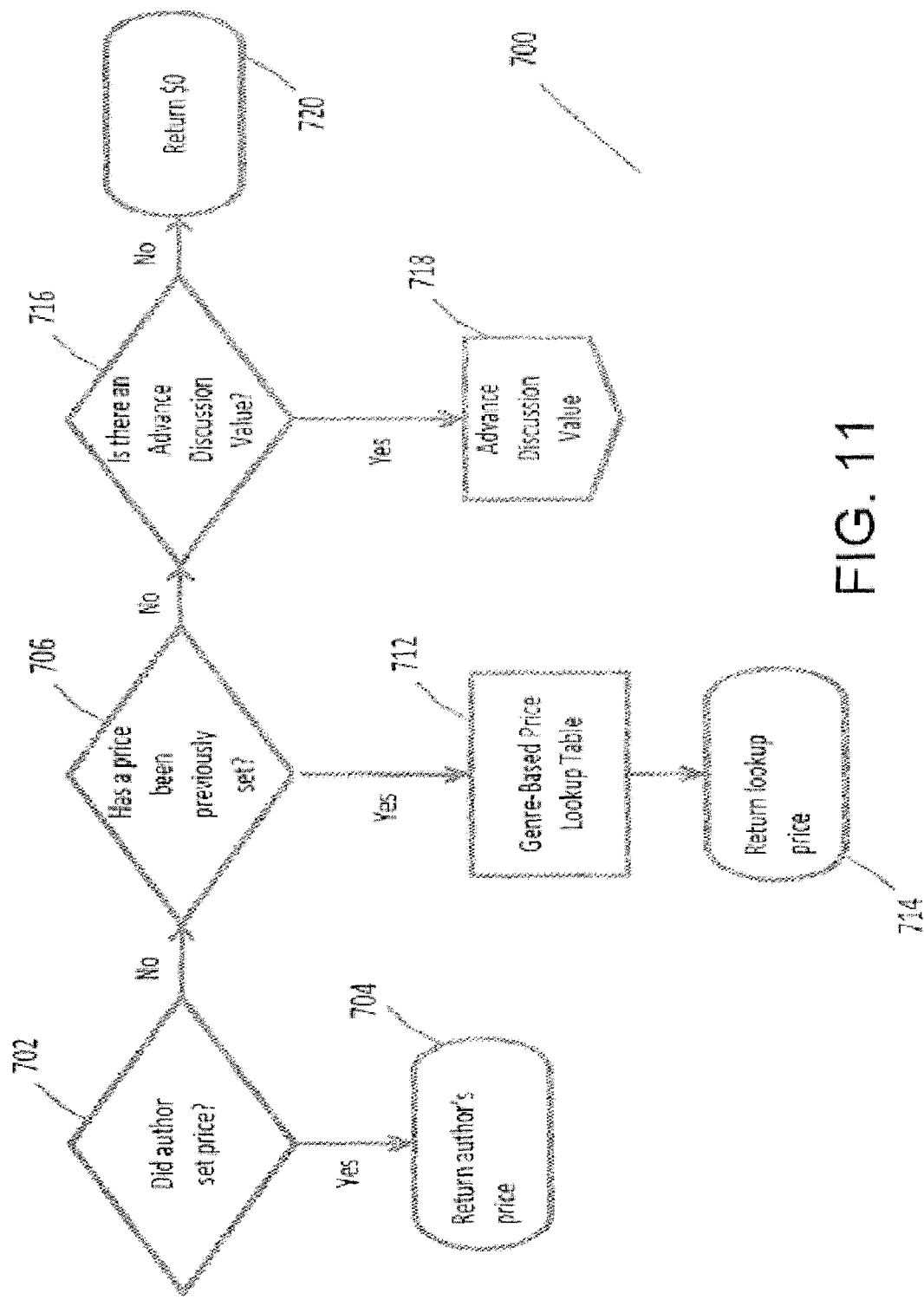
FIG. 11 is a flow chart for a method of digital content pricing, in accordance with the fourth exemplary embodiment.

FIG. 11 shows a flow chart for a method for use in a system configured according to the disclosure. In step 702, it is queried whether the author set the price tier. If yes, then the author price tier is returned in 704. If not, then it is queried whether the price tier has previously been set in 706. If yes in step 706, then a genre-based price lookup table process is done in step 712, and the lookup table price is returned in 714. If no in step 706, then it is queried if there is an advance discussion value in step 716, and if yes then an advance discussion value is obtained in step 718 and used to set an initial price tier, and if no in 716 then $0.00 is returned in step 720.

Figure 12:
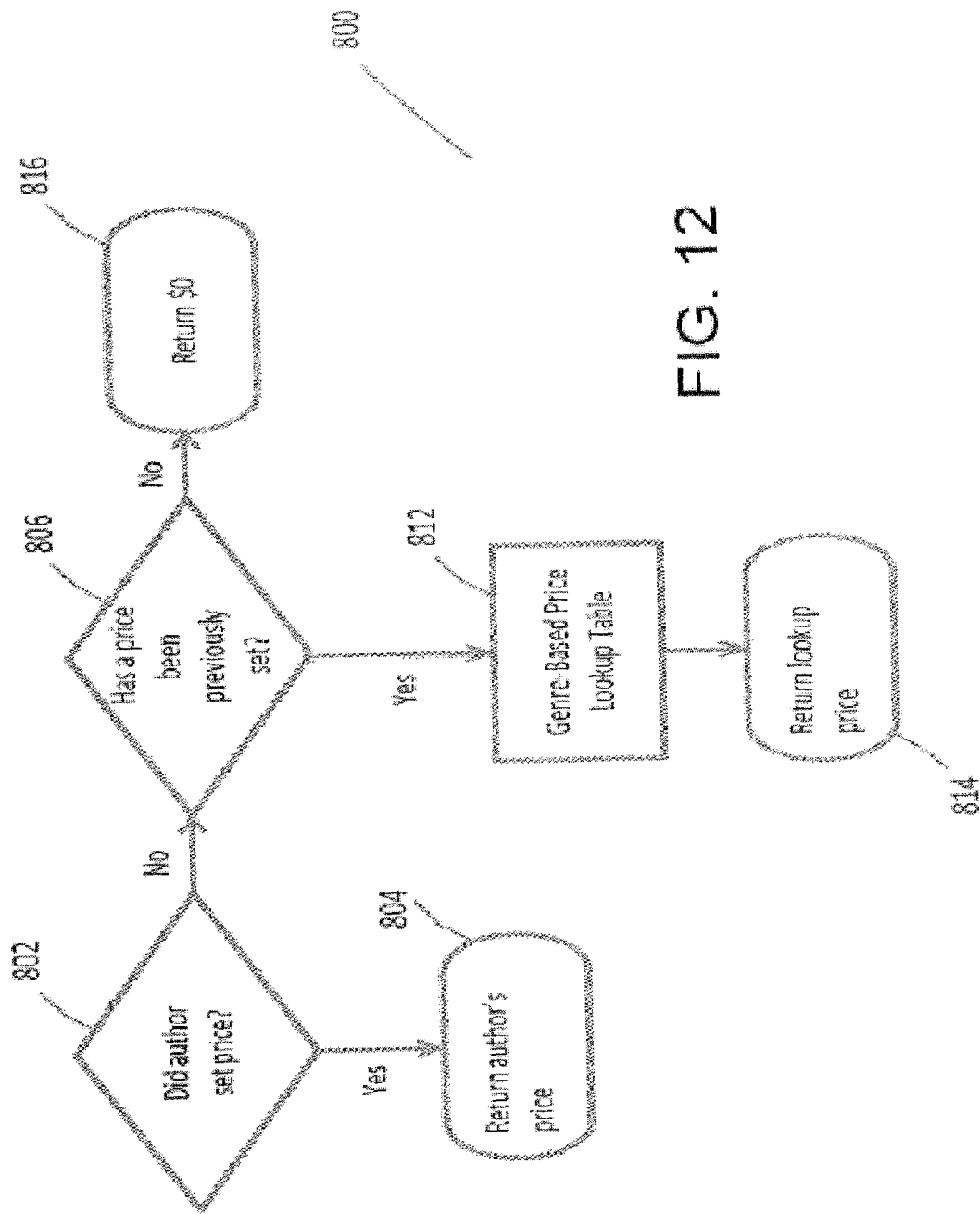
FIG. 12 is a flow chart for a method of digital content pricing, in accordance with the fourth exemplary embodiment.

FIG. 12 shows a flow chart for method for use in a system configured according to the disclosure. In step 802, it is queried whether the author set the price tier. If yes, then the author price tier is returned in 804. If not, then it is queried whether the price tier has previously been set in 806. If no, then $0.00 is returned in 818. If yes in step 806, a genre-based price lookup table process is done in step 812, a create/destroy top price tier is performed in step 816, and the lookup table price is returned in 814. If no in 806, then $0.00 is returned in step 816.

Figure 13A:
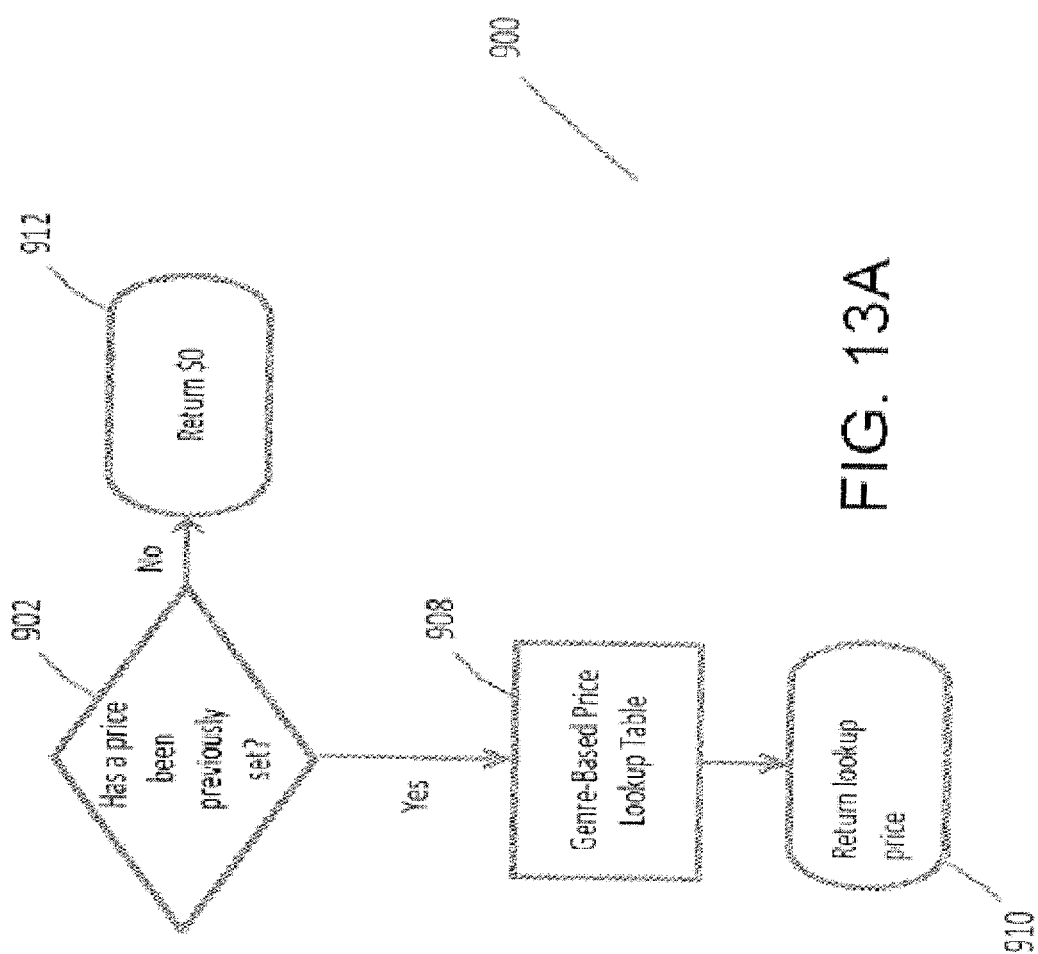
FIG. 13A is a flow chart for a method of digital content pricing, in accordance with the fourth exemplary embodiment.

FIG. 13A shows a flow chart for a method for use in a system configured according to the disclosure. In step 902, it is queried whether a price tier has previously been set. If a minimum time has passed, then a genre-based price lookup table is queried in step 908 and a lookup price is returned in step 910. Back to step 902, if a price tier has not been previously set, then $0.00 is returned in step 916.

Figure 13B:
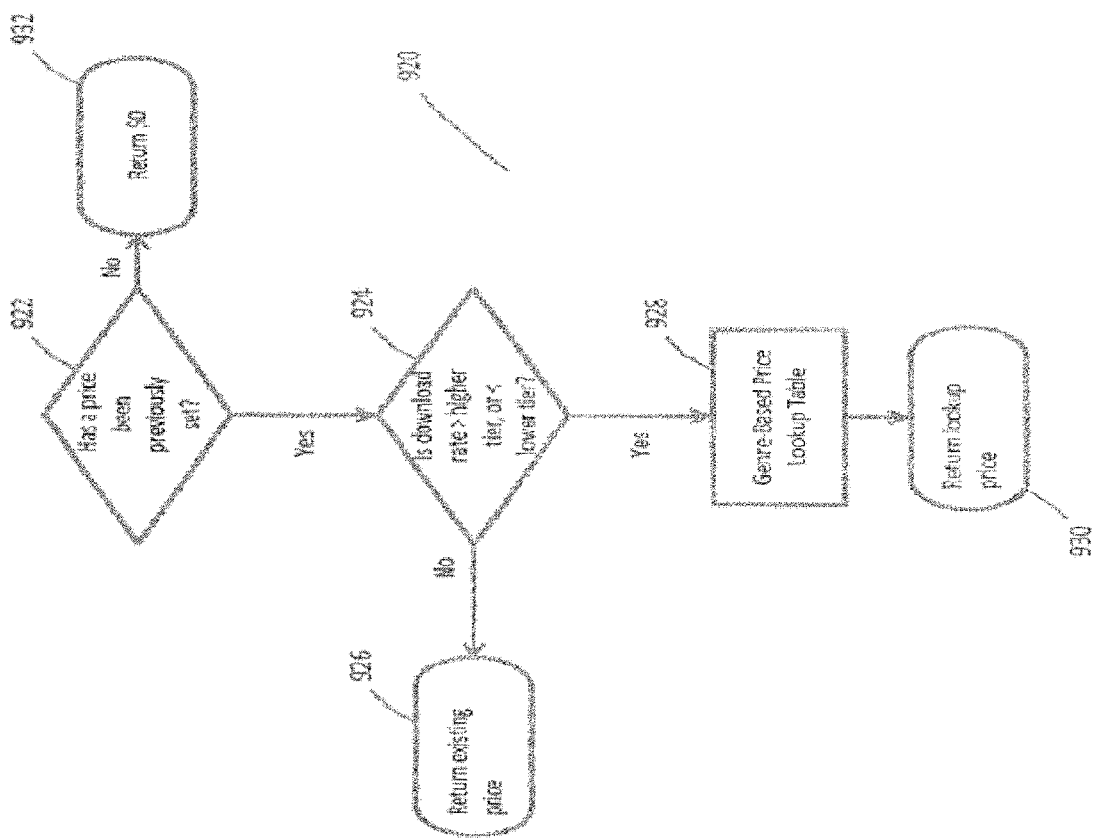
FIG. 13B is a flow chart for a method of digital content pricing, in accordance with the fourth exemplary embodiment.

FIG. 13B shows a flow chart for method for use in a system configured according to the disclosure. In step 922, it is queried whether a price tier has previously been set. If it has, then in step 924 it is queried whether the download rate is greater than the higher tier or less than the lower tier. If not, then the existing price tier is returned in step 926. If yes, then a genre-based price lookup table is queried in step 928 and a lookup price is returned in step 930. Back to step 922, if a price tier has not been previously set, then $0.00 is returned in step 932.

One key difference between the subject system and method versus other systems is that for the standard model of the subject system and method, there is no change-of-time component to the Tiering. Alternative models, however, may involve re-pricing a Title early because it had really high sales. For example, as shown in FIG. 13B, if the Title actually sees sales greater than the previous period's sales for the higher tier or some ratio of that figure relative to the amount of time that has passed (e.g., with the standard 2-week tiering period, maybe once per day, do a check of all downloads of all Titles and any that are greater than 1/7 times the number of days passed since the start of the period the total of the Title with least (or most or mean or median) downloads in the next higher tier automatically moves up to the next higher tier early).

Figure 14:
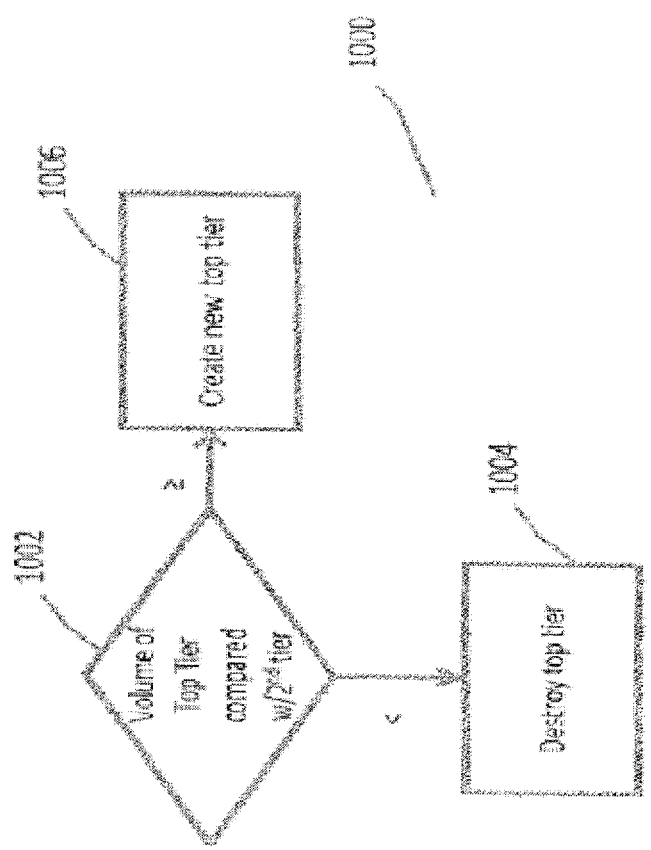
FIG. 14 is a flow chart for a method of digital content pricing, in accordance with the fourth exemplary embodiment.

FIG. 14 illustrates a process in which top tiers are created or destroyed. In step 1002, the volume of the top tier is compared to the volume of the second tier. If the top tier download volume is greater than or equal to that of the second tier, then a new top tier is created in step 1006. If the top tier is less than the second tier, then the top tier is destroyed, with all titles being re-assigned to the remaining tiers according to their relative popularity. This is the preferred method when all titles are re-tiered and priced at the same time after every unit of time (t).

Figure 15:
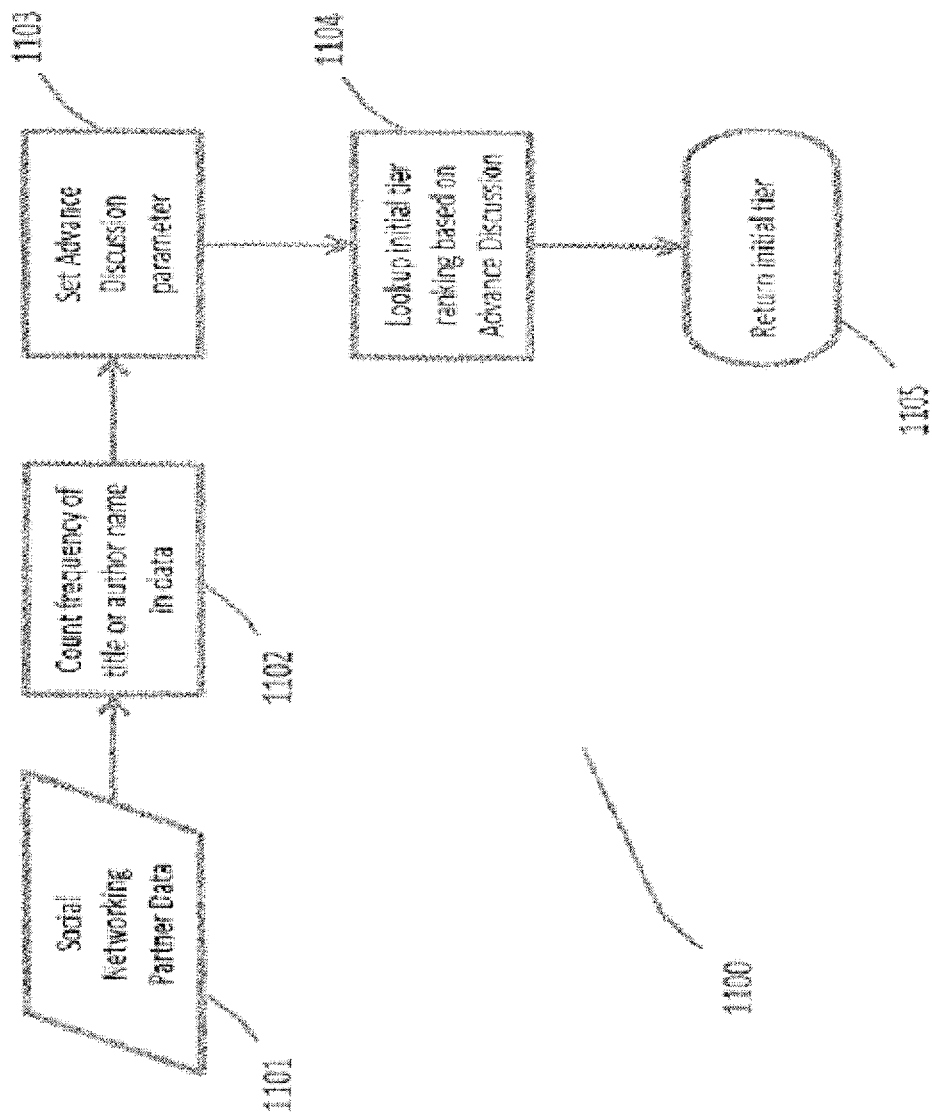
FIG. 15 is a flow chart for a method of digital content pricing, in accordance with the fourth exemplary embodiment.

FIG. 15 illustrates a process 1100 in which the advance discussion process is performed. In step 1101, the social networking partner data is received. In step 1102, the count frequency of the title or author name in data is measured. In step 1103, an advance discussion parameter is set. In step 1104, a process is performed to lookup an initial tier based on advance discussion. In step 1105, the initial tier is returned.

To perform the algorithmic functionality described relative to FIGS. 6-15, the lookup valuation or pricing module 112 may include tiering code which is run on the T2.large instance as a scheduled Lambda task. The tiering code may include specific algorithmic implementations for determining a digital media content item's position within a pricing or valuation table. Specifically, the code may include the following instructions for the definition of tier assignment:

```
def assign_tiers
    Book.pluck(:cp_group).uniq.map dc |cp_group|
        group_tiers = find_tiers(cp_group).map do |range, tiers|
            ranking = tiers.size + 1
            book_tiers = Cp::BookTier.transaction do
                tiers.map do |book_id, tier|
                    book_tier = Cp::BookTier
                        .find_or_initialize_by(book_id: book_id,
                        tier_start: range.first, tier_end: range.last)
                    unless @test
                        book_tier.book_id = book_id
                        book_tier.tier_start = range.first
                        book_tier.tier_end = range.last
                        book_tier.tier = tier[:tier]
                        book_tier.points = tier[:points]
                        book_tier.is_free = tier[:is_free]
                        book_tier.audiobook_uplift = tier[:audiobook_uplift]
                        book_tier.ranking = ranking -= 1
                        book_tier.cp_group = cp_group
                        book_tier.save!
                    end
                    yield(range, book_id, book_tier) if block_given?
                    book_tier
                end
            end
```

The definitions to identify or find a tier for a particular digital media content item, the tiering code may include the following instructions:

```
def find_tiers(cp_group)
    ranges.map do |range|
        # All books start at zero points
        book_points = Book
            .where{
                type: nil,
                status: 'active',
                cp_group: cp_group
            }
            .where('books.live_at IS NOT NULL AND books.live_at <= ?',
            range.end)
            .pluck(:id)
            .each_with_object({ }) { |id, result| result[id] = 0 }
        # Update with weight points from sources scribl, vearsa, and
        audiobooks
        weighted_points = book_points
            .merge(@scribl_tier.weighted_book_points(range, cp_group))
            do |book_id,
            base_points, scribl_points|
```

-continued

```
        base_points + scribl_points
      end
    .merge(@vearsa_tier.weighted_book_points(range, cp_group))
    do |book_id,
      base_points, vearsa_points|
      base_points + vearsa_points
    end
      base_points + audiobook_points
    end
  sales_reports = Cp:salesReport
    .joins(:book)
    .where(book_id: weighted_points.keys)
    .where(books: { cp_group: cp_group })
    .where('report_date <= ?', range.last)
  total_sales = Hash[
    sales_reports
      .group_by(&:book_id)
      .map do |book_id, reports|
        [book_id, reports.map { |r|
        r.scribl_price * r.quantity }.sum]
      end
  ]
  book_live_at =
  Hash[Book.where(id: weighted_points.keys).pluck(:id, :live_at)]
  # sort by points, total sales, and live_at
  now = Time.now
  sorted_points = weighted_points.sort_by do |book_id, points|
    [points, total_sales.fetch(book_id, 0),
     (now - book_live_at.fetch(book_id, now)).to_i]
  end
  starting_tiers = tier_distributions(sorted_points, cp_group)
  book_tiers = { }
  # for each tier, 1 to 7
  starting_tiers.each do |tier, books|
    books.each do |book_id, point|
      book_tiers[book_id] = adjust_tier(book_id, tier, points,
        range,first)
    end
  end
  apply_audiobook_uplift(range, book_tiers, cp_group)
  [range, book_tiers]
  end
end
```

Ranges for the time at which the digital media content items may be positioned in particular locations of the valuation or pricing tables may be defined with the following instructions:

```
def ranges
  current_start = EPOC
  current_end = current_start + 13.days
  while current_start < @start_date && current_end < @start_date
  do
    current_start = current_end + 1.day
    current_end = current_start + 13.days
  end
  ranges = [ ]
  while current_start < @end_date do
    current_end = [current_start + 13.days, @end_date].min
    # end if not a full 2 weeks
    if day_diff(current_start, current_end) < 13
      break
    end
    ranges << (current_start..current_end)
    current_start = current_end + 1.day
  end
  ranges
end
```

Processing of the digital media content items within the valuation tiers may include the following instructions:

```
  starting_tiers = { }
  current_size = sorted_book_points.size
  Rails.logger.info("Total books: #{current_size}")
  # Process tiers descending from 1 to 7
  ::BookTier.where(tier: (1..7).to_a).order(:tier).each do |tier|
    # Number of elements based on the percent of the total size
    num_in_tier = (current_size * tier.percentage / 100.0)
    # Round down on tier 6 to protect tier 7
    if tier.tier == 6
      num_in_tier = num_in_tier.floor
    else
      num_in_tier = num_in_tier.cell
    end
    # shift from the start of the array the number of elements
    starting_tiers[tier.tier] =
      sorted_book_points
        .shifted(num_in_tier)
    Rails.logger.info("Cp Group #{cp_group} Tier #{tier.tier} - number
    of book:#{num_in_tier} actual:#{starting_tiers[tier.tier].size}
    current_size = sorted_book_points.size
  end
  starting_tiers
end
```

The definitions for adjustment of tiers may include the following instructions:

```
def adjust_tier(book_id, tier, points, tier_end)
  # previous tiers
  tiers = Cp::BookTier
    .where(book_id: book_id)
    .where('tier_end < ?', tier_end)
    .order(:tier_start)
  number_times_free = tiers.select(&:is_free?).count
  previous_tier = tiers.last.try(:tier) || 1
  is_free = tiers.last.try(:is_free) || true
  # left tier 1, no longer free
  If tier > 1
    is_free = false
  # can only be free > times
  # once you leave the free tier, there is no return
  elsif is_free && (number_times_free >= 3 || previous_tier = 1)
    is_free = false
  end
  # can only fall one tier
  if tier < previous_tier - 1
    tier = previous_tier - 1
  end
```

Other tiering code may also be employed, depending on the design, implementation, and functionality of the system.

While certain exemplary embodiments have been described and shown in the accompanying drawings, it is to be understood that such embodiments are merely illustrative of and not restrictive on the broad disclosure, and that this disclosure is not limited to the specific constructions and arrangements shown and described, since various other modifications may occur to those ordinarily skilled in the art. Hence, alternative arrangements and/or quantities of, connections of various sorts, computer network systems that include arrangements and quantities of transistors to form circuits, and other features and functions can occur without departing from the spirit and scope of the disclosure. Similarly, components not explicitly mentioned in this specification can be included in various embodiments of this disclosure without departing from the spirit and scope of the disclosure. Also, different process steps and integrated circuit manufacture operations described as being performed to make certain components in various embodiments of this disclosure can, as would be apparent to one skilled in the art, be readily performed in whole or in part to make different components or in different configurations of components not explicitly mentioned in this specification without departing from the spirit and scope of the disclosure. Accordingly, the specification and drawings are to be regarded in an illustrative rather than a restrictive sense.

While certain exemplary embodiments have been described and shown in the accompanying drawings, it is to be understood that such embodiments are merely illustrative of and not restrictive on the broad disclosure, and that this disclosure is not limited to the specific constructions and arrangements shown and described, since various other modifications may occur to those ordinarily skilled in the art. Accordingly, the specification and drawings are to be regarded in an illustrative rather than a restrictive sense.

Again, the disclosure may have application in many areas, particularly in Internet storefront systems. Furthermore, the disclosure may extend to devices, systems and methods that would benefit from the disclosure. Those skilled in the art will understand that different combinations and permutations of the components described herein are possible within the spirit and scope of the disclosure, which is defined by the appended claims, their equivalents, and also claims presented in related applications in the future and their equivalents.

The disclosure may also involve a number of functions to be performed by a computer processor, such as a microprocessor. The microprocessor may be a specialized or dedicated microprocessor that is configured to perform particular tasks according to the disclosure, by executing machine-readable software code that defines the particular tasks embodied by the disclosure. The microprocessor may also be configured to operate and communicate with other devices such as direct memory access modules, memory storage devices, Internet related hardware, and other devices that relate to the transmission of data in accordance with the disclosure. The software code may be configured using software formats such as Java, C++, XML (Extensible Mark-up Language) and other languages that may be used to define functions that relate to operations of devices required to carry out the functional operations related to the disclosure. The code may be written in different forms and styles, many of which are known to those skilled in the art. Different code formats, code configurations, styles and forms of software programs and other means of configuring code to define the operations of a microprocessor in accordance with the disclosure will not depart from the spirit and scope of the disclosure.

Within the different types of devices, such as laptop or desktop computers, hand held devices with processors or processing logic, and also possibly computer servers or other devices that utilize the disclosure, there exist different types of memory devices for storing and retrieving information while performing functions according to the disclosure. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the disclosure when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the disclosure as described herein enable the physical transformation of these memory devices. Accordingly, the disclosure as described herein is directed to novel and useful systems and methods that, in one or more embodiments, are able to transform the memory device into a different state. The disclosure is not limited to any particular type of memory device, or any commonly used protocol for storing and retrieving information to and from these memory devices, respectively.

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure. The machine-readable medium includes any mechanism that provides (i.e., stores and/or transmits) information in a form readable by a machine (e.g., a computer, PDA, cellular telephone, etc.). For example, a machine-readable medium includes memory (such as described above); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers or as different virtual machines.

While certain exemplary embodiments have been described and shown in the accompanying drawings, it is to be understood that such embodiments are merely illustrative of and not restrictive on the broad disclosure, and that this disclosure not be limited to the specific constructions and arrangements shown and described, since various other modifications may occur to those ordinarily skilled in the art. Accordingly, the specification and drawings are to be regarded in an illustrative rather than a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or Claim refers to "a" or "an" element, that does not mean there is only one of the element. If the specification or Claims refer to "an additional" element, that does not preclude there being more than one of the additional element.

The methods, systems and devices include improved systems and methods for downloading digital content and providing an infrastructure for compensation to authors and other monetization operations. Such systems would greatly benefit from increased convenience for both buyers and sellers. Although this embodiment is described and illustrated in the context of devices, systems and related methods of downloading authored content including music and software applications, the scope of the disclosure extends to other applications where such functions are useful. Furthermore, while the foregoing description has been with reference to particular embodiments of the disclosure, it will be appreciated that these are only illustrative of the disclosure and that changes may be made to those embodiments without departing from the principles of the disclosure, the scope of which is defined by the appended claims and their equivalents.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A digital media content classification, discovery, and management method comprising the steps of:
    providing a plurality of digital files;
    associating a plurality of content representative identifiers with each of the digital files, wherein each of the plurality of content representative identifiers corresponds to at least one of a plurality of author-based, content-centered literary criteria elements assigned within literary criteria categories, wherein the plurality of author-based, content-centered literary criteria elements are identified by an author of the each of the plurality of digital files, respectively, wherein the literary criteria categories comprise: a rating factor of the digital file; a setting of the digital file; a style of the digital file; a theme of the digital file; and a main character characteristic of the digital file;
    wherein author-based, content-centered literary criteria elements of the rating factor of the digital file comprise: violence, language, sexual content, and target audience,
    wherein author-based, content-centered literary criteria elements of the setting of the digital file comprise: time period, setting type, and realism,
    wherein author-based, content center literary criteria elements of at least one of the style of the digital file and the theme of the digital file comprise: physical action, pacing, romance, mysteries and puzzles, humor, inspiration of reader, and political and social commentary,
    wherein author-based, content centered literary criteria elements of the main character characteristic of the digital file comprise: gender, age, race, sexual preference, and religion;
    determining a user selection of at least one of a plurality of selectable fields based on a selection of the literary criteria categories and the author-based, content-centered literary criteria elements thereof, using at least one input selection field displayed on a graphical user interface (GUI) of a computerized device of the user, wherein the at least one input selection field has the plurality of selectable fields, wherein each of the plurality of selectable fields matches at least one of the plurality of author-based, content-centered criteria elements; filtering the author-based, content-centered literary criteria elements based on the determined user selection, whereby author-based, content-centered literary criteria elements matching the determined user selection are populated in a results list and author-based, content-centered literary criteria elements not matching the determined user selection are omitted from the populated results list;
    filtering the digital files based on the filtered author-based, content-centered literary criteria elements;
    assigning a point value to each of the filtered author-based, content-centered literary criteria elements;
    ranking, based on the point value, the plurality of digital files having the filtered author-based, content-centered literary criteria elements within one of the assigned literary criteria categories against all other digital files within that assigned literary criteria category, wherein digital files in different assigned literary criteria categories are not ranked against each other;
    displaying a result of the filtered plurality of selectable fields on the GUI of the computer device of the user, wherein the result has at least a portion of the plurality of digital files keyed to the plurality of author-based, content-centered literary criteria elements; and
    saving the result of the filtered plurality of selectable fields and associating a name with the saved result, enabling the user to retrieve the same result at a later point of time.

2. The method of claim 1, wherein each of the author-based, content-centered literary criteria elements are made objectively by the author.

3. The method of claim 1, wherein the author-based, content-centered literary criteria elements are made both objectively and subjectively by the author.

4. The method of claim 1, wherein each of the literary criteria categories are visible as separated blocks of a selection menu of a GUI.

5. The method of claim 4, wherein the author-based, content-centered literary criteria elements of the literary criteria categories are visible as selectable fields within the separated blocks of the selection menu of the GUI.

6. The method of claim 5, wherein each of the author-based, content-centered literary criteria elements of the literary criteria categories further comprises a plurality of literary descriptors of the digital files, each of the literary descriptors being selectable by the user after selection of the author-based, content-centered literary criteria element.

7. The method of claim 1, wherein each of the author-based, content-centered literary criteria elements is classified as one of: a Top Level Genre (TLG) and a non-Top Level Genre (Non-TLG).

8. The method of claim 1, wherein each of the author-based, content-centered literary criteria elements has a finite set of possible values.

9. A system for digital media content classification and discovery comprising:
    a plurality of digital files;
    a plurality of content representative identifiers associated with each of the digital files, wherein each of the plurality of content representative identifiers corresponds to at least one of a plurality of author-based, content-centered literary criteria elements assigned within literary criteria categories, wherein the plurality of author-based, content-centered literary criteria elements are identified by an author of the each of the plurality of digital files, respectively, wherein the literary criteria categories comprise: a rating factor of the digital file; a setting of the digital file; a style of the digital file; a theme of the digital file; and a main character characteristic of the digital file;

wherein author-based, content-centered literary criteria elements of the rating factor of the digital file comprise: violence, language, sexual content, and target audience, wherein author-based, content-centered literary criteria elements of the setting of the digital file comprise: time period, setting type, and realism, wherein author-based, content center literary criteria elements of at least one of the style of the digital file and the theme of the digital file comprise: physical action, pacing, romance, mysteries and puzzles, humor, inspiration of reader, and political and social commentary, wherein author-based, content centered literary criteria elements of the main character characteristic of the digital file comprise: gender, age, race, sexual preference, and religion;

determining by a hardware processor a user selection of at least one of a plurality of selectable fields determined based on a selection of the literary criteria categories and the author-based, content-centered literary criteria elements thereof, using at least one input selection field displayed on a graphical user interface (GUI) of a computerized device of a user, wherein the at least one input selection field has the plurality of selectable fields, wherein each of the plurality of selectable fields matches at least one of the plurality of author-based, content-centered criteria elements;

filtering by the hardware processor the author-based, content-centered literary criteria elements based on the determined user selection, whereby author-based, content-centered literary criteria elements matching the determined user selection are populated in a results list and author-based, content-centered literary criteria elements not matching the determined user selection are omitted from the populated results list;

filtering by the hardware processor the digital files based on the filtered author-based, content-centered literary criteria elements;

assigning by the hardware processor a point value to each of the filtered author-based, content-centered literary criteria elements;

ranking by the hardware processor, based on the point value, the plurality of digital files having the filtered author-based, content-centered literary criteria elements within one of the assigned literary criteria categories against all other digital files within that assigned literary criteria category, wherein digital files in different assigned literary criteria categories are not ranked against each other;

displaying by the hardware processor a result of the filtered plurality of selectable fields on the GUI of the computer device of the user, wherein the result has at least a portion of the plurality of digital files keyed to the plurality of author-based, content-centered literary criteria elements; and saving by the hardware processor the result of the filtered plurality of selectable fields and associating a name with the saved result, enabling the user to retrieve the same result at a later point of time.

10. The system of claim 9, wherein each of the author-based, content-centered literary criteria elements are made objectively by the author.

11. The system of claim 9, wherein the author-based, content-centered literary criteria elements are made both objectively and subjectively by the author.

12. The system of claim 9, wherein each of the literary criteria categories are visible as separated blocks of a selection menu of a GUI.

13. The system of claim 12, wherein each of the author-based, content-centered literary criteria elements of the literary criteria categories are visible as selectable fields within the separated blocks of the selection menu of the GUI.

14. The system of claim 13, wherein each of the author-based, content-centered literary criteria elements of the literary criteria categories further comprises a plurality of literary descriptors of the digital files, each of the literary descriptors being selectable by the user after selection of the author-based, content-centered literary criteria element.

15. The system of claim 9, wherein each of the author-based, content-centered literary criteria elements is classified as one of: a Top Level Genre (TLG) and a non-Top Level Genre (Non-TLG).

16. The system of claim 9, wherein each of the author-based, content-centered literary criteria elements has a finite set of possible values.

* * * * *